United States Patent
Wang et al.

(10) Patent No.: US 11,353,616 B2
(45) Date of Patent: Jun. 7, 2022

(54) METHODS AND SYSTEMS FOR PROCESSING SLOWNESS VALUES FROM BOREHOLE SONIC DATA

(71) Applicant: HALLIBURTON ENERGY SERVICES, INC., Houston, TX (US)

(72) Inventors: Ruijia Wang, Singapore (SG); Richard Timothy Coates, Katy, TX (US); Kristoffer Thomas Walker, Kingwood, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/492,068

(22) PCT Filed: Oct. 9, 2018

(86) PCT No.: PCT/US2018/055048
§ 371 (c)(1),
(2) Date: Sep. 6, 2019

(87) PCT Pub. No.: WO2020/076308
PCT Pub. Date: Apr. 16, 2020

(65) Prior Publication Data
US 2021/0325558 A1    Oct. 21, 2021

(51) Int. Cl.
*G01V 1/50*    (2006.01)
*G06N 20/00*    (2019.01)
(Continued)

(52) U.S. Cl.
CPC .............. *G01V 1/50* (2013.01); *G01V 1/282* (2013.01); *G01V 1/305* (2013.01); *G06N 20/00* (2019.01);
(Continued)

(58) Field of Classification Search
USPC .......................................................... 702/2
See application file for complete search history.

(56) References Cited

U.S. PATENT DOCUMENTS

| | | |
|---|---|---|
| 5,278,805 A | 1/1994 | Kimball |
| 6,581,010 B2 | 6/2003 | Dubinsky et al. |

(Continued)

FOREIGN PATENT DOCUMENTS

| | | |
|---|---|---|
| EP | 2672293 A2 | 11/2013 |
| WO | 2017172810 A1 | 10/2017 |

(Continued)

OTHER PUBLICATIONS

Goobie et al,. "A Sound Approach to Drilling", Oilfield Review, 2006.
(Continued)

*Primary Examiner* — Paul D Lee
(74) *Attorney, Agent, or Firm* — Polsinelli PC

(57) ABSTRACT

Acoustic waves are obtained from an acoustic logging tool within a borehole passing through a formation. Signal properties in a time domain, frequency domain, or both are determined based on the obtained acoustic waves. A machine learning analysis is used to determine formation slowness based on the determined signal properties and a downhole operational parameter is adjusted based on the determined formation slowness.

20 Claims, 19 Drawing Sheets

(51) Int. Cl.
    *G01V 1/28* (2006.01)
    *G01V 1/30* (2006.01)
(52) U.S. Cl.
    CPC .... *G01V 2210/47* (2013.01); *G01V 2210/582* (2013.01); *G01V 2210/6222* (2013.01)

(56) References Cited

U.S. PATENT DOCUMENTS

| | | | |
|---|---|---|---|
| 6,868,341 B2 | 3/2005 | Valero | |
| 7,649,805 B2 | 1/2010 | Bose et al. | |
| 7,698,066 B2 | 4/2010 | Huang et al. | |
| 8,456,952 B2 | 6/2013 | Tang et al. | |
| 9,557,438 B2 | 1/2017 | Wessling et al. | |
| 2005/0254343 A1* | 11/2005 | Saiki | G01V 1/36 367/31 |
| 2009/0257307 A1* | 10/2009 | Valero | G01V 1/50 367/31 |
| 2010/0085835 A1* | 4/2010 | Tang | G01V 1/30 367/32 |
| 2017/0115420 A1 | 4/2017 | Cazeneuve et al. | |
| 2018/0017690 A1 | 1/2018 | Sirui et al. | |

FOREIGN PATENT DOCUMENTS

| | | |
|---|---|---|
| WO | 2018084847 A1 | 5/2018 |
| WO | 2018125058 A1 | 7/2018 |

OTHER PUBLICATIONS

International Search Report and Written Opinion; PCT Application No. PCT/US2018/055048; dated Oct. 9, 2018.
Wang, P., Bose, S., Sinha, B. K., & Blyth, M. (Jun. 25, 2016). Dipole Shear Anisotropy Using Logging-While-Drilling Sonic Tools. Society of Petrophysicists and Well-Log Analysts.

* cited by examiner

650 ⇘

652 Generate synthetic waveforms for multiple formation types and borehole diameters and include different noise levels for each waveform

654 Generate time-domain semblance maps

656 Identify coherent candidate arrivals using unsupervised clustering

658 Associate clusters with a tool mode, a DTC mode, a DTRS mode, or a stoneley mode

660 Extract features from the semblance maps and associated attributes to generate model coefficients and rules

702 Generate modeled datasets each including noise

704 Determine a fastest modal slowness for each dataset

706 Apply machine learning to the modeled datasets, fastest modal slownesses, and waveform signal to noise rations in order to determine relationships between input body wave slowness and the estimated fastest modal slowness

708 Applying the determined relationships to log data, fastest modal slowness from field data, and waveform signal to noise ratio to generate final body wave slowness values for field data

FIG. 7

METHODS AND SYSTEMS FOR PROCESSING SLOWNESS VALUES FROM BOREHOLE SONIC DATA

CROSS-REFERENCE TO RELATED APPLICATIONS

This application is a national stage entry of PCT/US2018/056253 filed Oct. 17, 2018, said application is expressly incorporated herein in its entirety.

TECHNICAL FIELD

The present technology pertains to the processing of acoustic logging data acquired in a well bore, and more specifically to formation slowness estimation.

BACKGROUND

Various acoustic properties of a borehole are logged and processed in order to monitor and predict borehole characteristics throughout drilling. Generally, acoustic phenomena, such as borehole dispersion, are analyzed in order to extract other properties related to the borehole and formation. For example, a body wave slowness can be extracted from borehole dispersion curves in order to gain insight into petrophysical and geomechanical properties of the formation.

Conventional processing often utilizes either the most energetic part of waveform data (e.g., Airy-Phase components) or the most coherent part of the data (e.g., data with the highest signal-to-noise ratio or "SNR") in order to determine a body wave slowness log from dispersive waves. However, this might require separation of tool modes from a target mode of interest, which may be challenging for certain target modes due to borehole-tool mode coupling (e.g., due to proximity of the tool to the borehole interior and the like). Furthermore, some target modes may require a dispersion correction in order to relate a measured slowness along a dispersion curve to a low-frequency asymptote characterizing formation slowness. The resulting dispersion-corrected slowness is often inaccurate due to a low signal-to-noise ratio (SNR), interference from other modes, or incorrect assumptions about the dispersion model. For example, when conventionally real-time processing for compressional slowness (DTC) in a slow formation, a picked slowness at the most coherent part may be taken as a final value due to a lack of information visible above a noise floor and thus an inability to characterize a low frequency asymptote as a result.

In other examples, such as for shear slowness (DTS) picking from dipole or quadrupole data, conventional processing may apply a frequency-domain and model-based dispersion correction on extracted time-domain slowness peaks. However, time-domain slowness peaks do not necessarily represent the phase slowness that is assumed in the subsequent dispersion correction schemes, and so the resultant formation slowness measurement may be of limited or low accuracy. Furthermore, a dispersion correction on a time-domain slowness pick often requires a frequency associated with the pick. Typically, either an instantaneous frequency at the time of the pick or a central frequency computed from averaging magnitude spectra of all receivers is used for the dispersion correction. In either case, the chosen frequency will be prone to significant error, and so it too can impact the dispersion correction, potentially leading to a biased formation slowness estimation. Additionally, unknown factors such as formation anisotropy and alteration may limit the accuracy of real-time processing results and require an interpretation for estimating true poroelastic and/or geomechanic rock properties.

In yet other cases, frequency-domain and data-driven processing can be used to determine DTC and DTS when data is of a high quality and the borehole environment is simple. However, frequency-based processing often uses a Fourier transform to convert time-domain data to frequency-domain data and includes noise signals with different arrival times, thus impacting all processed frequencies. Consequently, complex borehole environments may cause low SNRs and so require preprocessing to either isolate target modes from interfering modes or suppress the noise level.

BRIEF DESCRIPTION OF THE DRAWINGS

The embodiments herein may be better understood by referring to the following description in conjunction with the accompanying drawings in which like reference numerals indicate analogous, identical, or functionally similar elements. Understanding that these drawings depict only exemplary embodiments of the disclosure and are not therefore to be considered to be limiting of its scope, the principles herein are described and explained with additional specificity and detail through the use of the accompanying drawings in which:

FIG. 6B is a method flowchart for generating a model for processing waveforms, implementing various embodiments of the present disclosure;

FIG. 7 is a method flowchart for applying a dispersion correction, implementing various embodiments of the present disclosure;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

This disclosure provides techniques for methods and systems for estimating formation body wave slownesses from processing of borehole waves for non-dispersive and dispersive modes. The estimations are performed in the time-domain in order to effectively isolate signals of interest and to reduce the negative effects of noise. Machine learning techniques can identify formation compressional and shear slownesses time-slowness features. Where a time-slowness feature is dispersive in nature, a simplified time-domain dispersion model (e.g., a slowness-travel time dispersion model) can account for combined dispersion effects of multi-order modes in order to fit true time-slowness measurements.

Borehole sonic wave modes are often dispersive (e.g., will separate into component frequencies due to passing through a medium) and can include, for example and without imputing limitation, leaky-P waves, flexural waves, screw waves, and pseudo-Rayleigh waves. Information, such as low frequency asymptotes and cut-off frequencies, about the propagation medium can be obtained from analyzing the wave modes in order to determine formation body wave slowness (e.g., compressional slowness, shear slowness, and the like).

Figure 1:
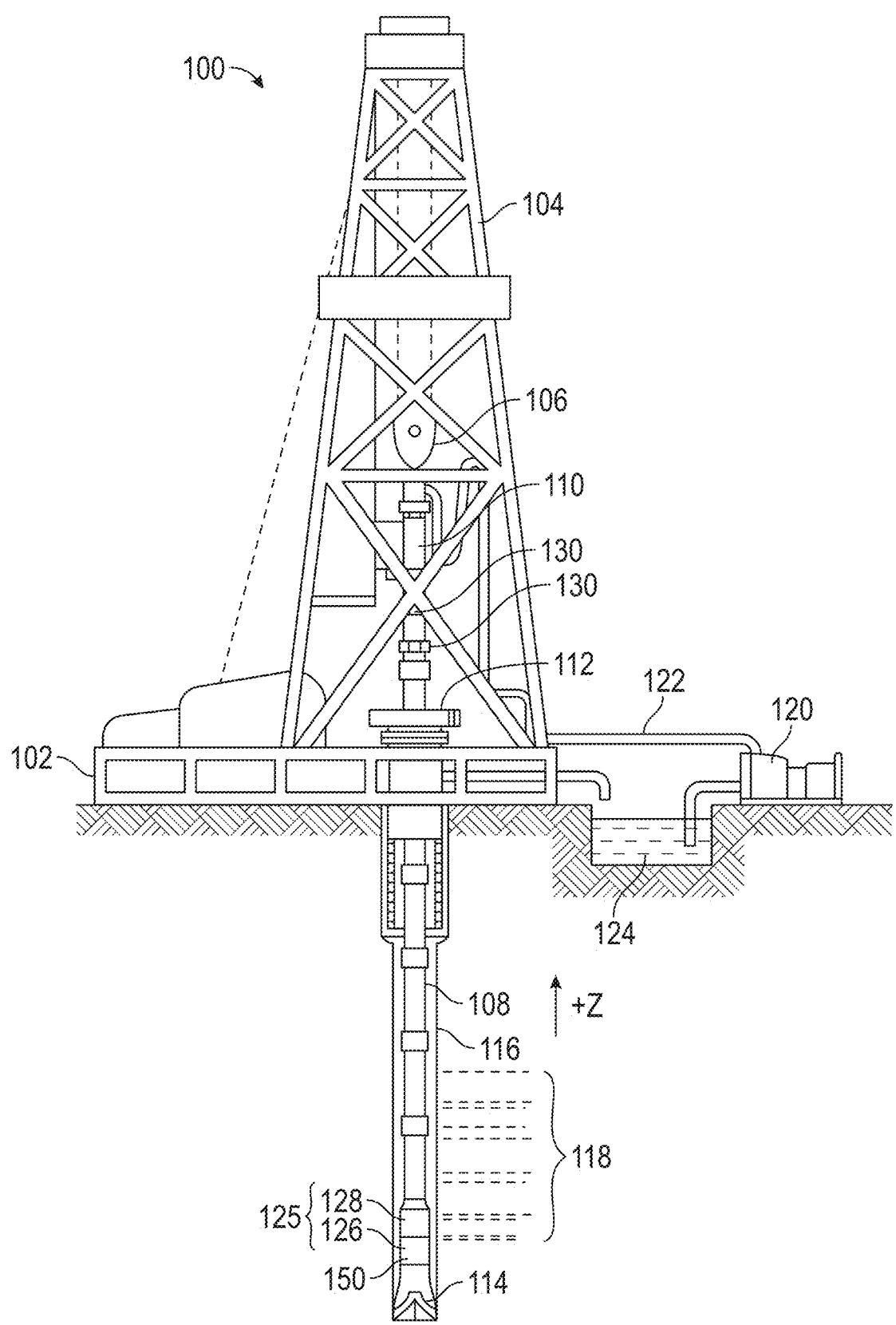
FIG. 1 is a schematic diagram of an example logging-while-drilling (LWD) environment, according to various embodiments of the subject technology.

FIG. 1 illustrates a diagrammatic view of an exemplary logging while drilling (LWD) and/or measurement while drilling (MWD) borehole operating environment 100 in which the present disclosure can be implemented. A drilling platform 102 is equipped with a derrick 104 that supports a hoist 106 for raising and lowering a drill string 108. The hoist 106 suspends a top drive 110 suitable for rotating the drill string 108 and lowering the drilling string 108 through the well 112. Connected to the lower end of the drill string 108 is a drill bit 114 which creates a borehole 116 by rotating and passing through various geological formations 118. A pump 120 circulates drilling fluid through a supply pipe 122 to top drive 11, down through the interior of drill string 108, through orifices in drill bit 114, back to the surface via the annulus around drill string 108, and into a retention pit 124. The drilling fluid transports cuttings from the borehole 116 into the pit 124 and aids in maintaining the integrity of the borehole 116. Various materials can be used for drilling fluid, including oil-based fluids and water-based fluids.

Logging tools 126 can be integrated into a bottom-hole assembly 125 near the drill bit 114. As the drill bit 114 extends the borehole 116 through the formations 118, logging tools 126 collect measurements relating to various formation properties as well as tool and/or other drilling conditions. The bottom-hole assembly 125 can also include a telemetry sub 128 to transfer measurement data to a surface receiver 130 and to receive commands from the surface. In some embodiments, the telemetry sub 128 does not communicate with the surface, but rather stores logging data for later retrieval at the surface when the logging assembly is recovered.

Each of the logging tools 126 can include multiple tool components, spaced apart from each other, and communicatively coupled with one or more wires. Logging tools 126 can include, for example, sonic receivers and/or emitters for performing acoustic measurements of the borehole 116. The telemetry sub 128 can include wireless telemetry or logging capabilities, or both, such as to transmit or later provide information indicative of received acoustic energy/waveforms (e.g., pressure waves, etc.) to operators on the surface or for later access and data processing for the evaluation of formation 118 properties.

The logging tools 126, including the acoustic logging tool, may also include one or more computing devices 150 communicatively coupled with one or more of the plurality of tool components. The computing device 150 may be configured to control or monitor the performance of the tools 126, process logging data, and/or carry out the methods of the present disclosure.

In some embodiments, one or more of the logging tools 126 may communicate with a surface receiver 130, such as wired drillpipe. In other cases, the one or more of the logging tools 126 can communicate with a surface receiver 130 by wireless signal transmission. In at least some cases, one or more of the logging tools 126 may receive electrical power from a wire that extends to the surface, including wires extending through a wired drillpipe. In at least some instances the methods and techniques of the present disclosure may be performed by a computing device (not shown) located on the surface. In some embodiments, the computing device may be included in the surface receiver 130. For example, surface receiver 130 of the wellbore operating environment 100 at the surface may include one or more of wireless telemetry, processor circuitry, or memory facilities, such as to support substantially real-time processing of data received from one or more of the logging tools 126. In some embodiments, data is processed at some time subsequent to its collection, wherein the data may be stored on the surface at surface receiver 130, stored downhole in telemetry sub 128 or both, until it is retrieved for processing.

Figure 2:
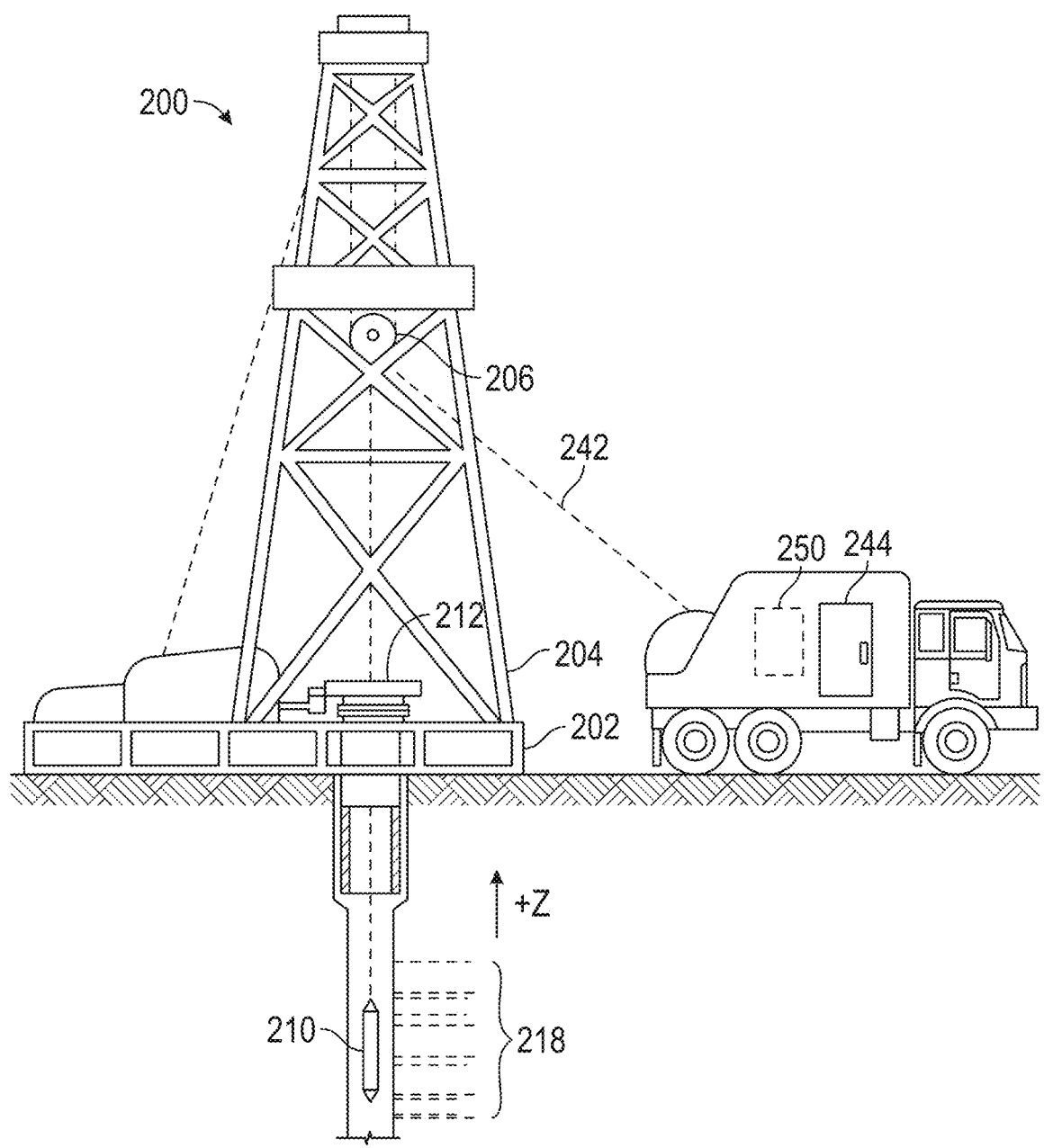
FIG. 2 is a schematic diagram of an example wireline conveyance logging environment, according to various embodiments of the subject technology.

FIG. 2 illustrates a diagrammatic view of a conveyance logging (WL) borehole operating environment 200 (also referred to as "wireline" in the field) in which the present disclosure can be implemented. A hoist 206 can be included as a portion of a platform 202 which is coupled to a derrick 204. The hoist 206 may be used to raise or lower equipment such as acoustic logging tool 210 into or out of a borehole. Acoustic logging tool 210 can include, for example, sonic receivers and/or emitters for performing acoustic measurements of the borehole. A conveyance 242 provides a communicative coupling between the acoustic logging tool 210 and a logging facility 244 at the surface. The conveyance 242 may include wires (one or more wires), slicklines, cables, or the like, as well as tubular conveyances such as coiled tubing, joint tubing, or other tubulars, and may include a downhole tractor. Additionally, power can be supplied via the conveyance 242 to meet power requirements of the tool. The acoustic logging tool 210 may have a local power supply, such as batteries, downhole generator and the like. When employing non-conductive cable, coiled tubing, pipe string, or downhole tractor, communication may be supported using, for example, wireless protocols (e.g. EM, acoustic, etc.), and/or measurements and logging data may be stored in local memory for subsequent retrieval. The logging facility 244 may include a computing device 250 able to carry out the methods and techniques of the present disclosure. Data regarding a formation 218 can be obtained by acoustic logging tool 210 and processed by computing device 250. In some embodiments, computing device 250 may be equipped to process received information in substantially real-time. In some embodiments, computing device 250 may store the received information for later retrieval and processing, either on-site or elsewhere.

Figure 3:
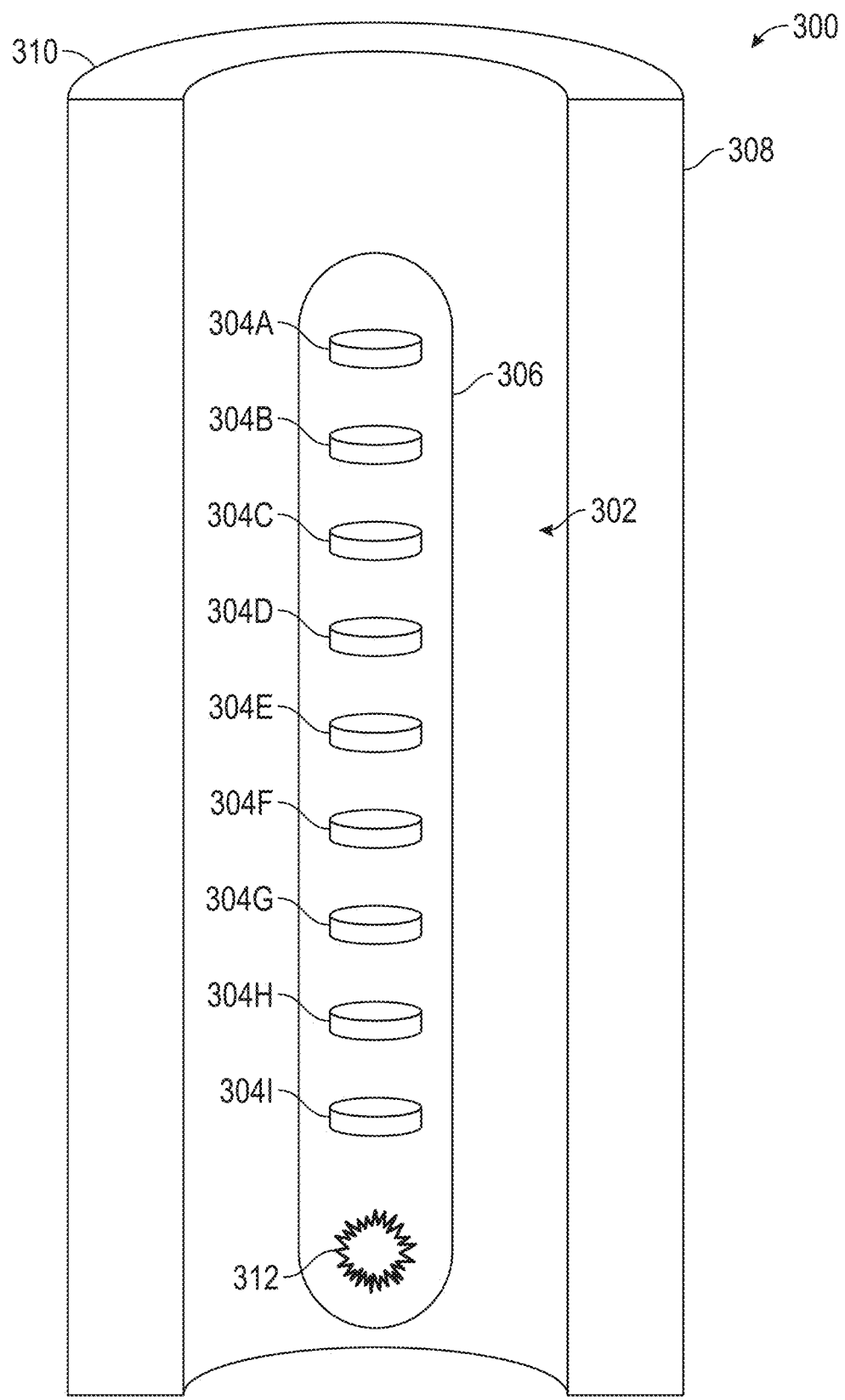
FIG. 3 is a diagrammatic view of an fluid-filled borehole model, according to various embodiments of the subject technology.

FIG. 3 illustrates a diagrammatic view of a borehole operating environment model 300 which may be used by the methods of the present disclosure. The borehole operating environment model 300 includes a fluid-filled borehole 302 which extends down from a surface 310 and may be filled with mud, drilling fluid, and other fluid materials. A sonic logging tool 306 is included within the fluid-filled borehole 302 and can be a WL sonic logging tool or an LWD sonic logging tool. A formation 308 is further included in the borehole operating environment model 300 and surrounds the fluid-filled borehole 302.

The sonic logging tool 306 can measure refracted and guided waves propagating along sidewalls of the fluid-filled borehole 302. Acoustic properties of the formation 308 can then be extracted (e.g., derived) from the measured waves. More particularly, the sonic logging tool 306 includes an acoustic emitter 312 which can excite acoustic waves for a set of receivers 304A-I to receive at various locations along the sonic logging tool 306. Further, data regarding the fluid-filled borehole 302 and surrounding formation 308 can be determined by various characteristics of a wave propagation detected by each receiver 304A-I receiving the wave in sequence. For example, a time delay between receiver 304I receiving a particular waveform and receiver 304H receiving the same particular waveform may be used to determine various characteristics of the medium through which the wave propagated (e.g., the fluid-filled borehole 302 or formation 308).

The sonic logging tool can excite and capture borehole guided waves such as, for example and without imputing limitation, flexural waves for WL logging, screw waves for LWD logging, and leaky-P waves for a soft formation. The captured borehole guided waves can then be used to measure acoustic properties of the formation 308, such as formation body compressional slowness and body shear wave slowness.

Figure 4A:
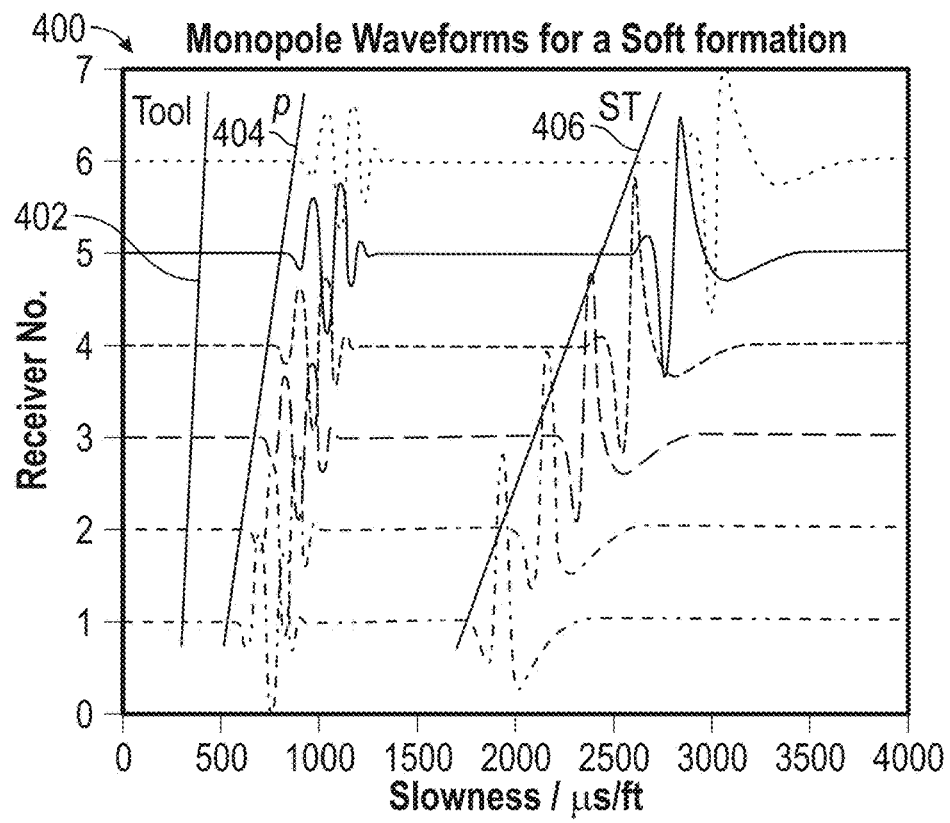
FIG. 4A is a graph of waveforms for a soft formation, according to various embodiments of the subject technology.
Figure 4B:
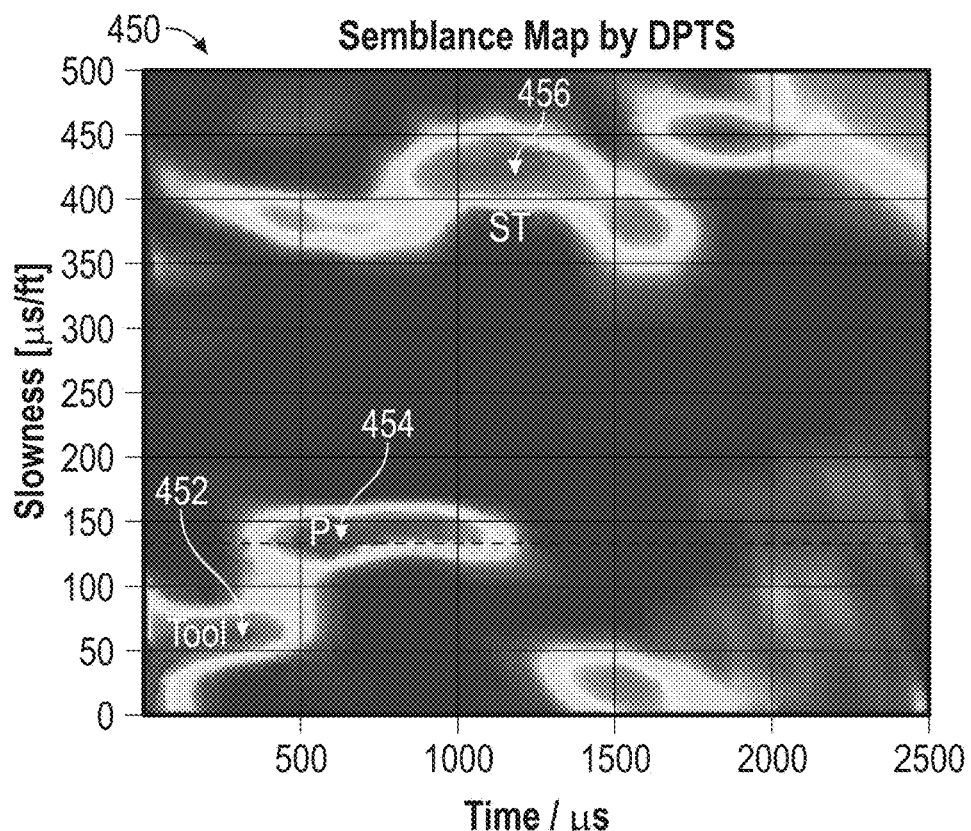
FIG. 4B is a semblance map, according to various embodiments of the subject technology.

FIG. 4A and FIG. 4B show a graph of synthetic borehole monopole waveforms for a soft formation and an associated semblance map respectively. The monopole waveforms are fired in a soft formation with 133 µs/ft compressional slowness.

The synthetic borehole monopole waveforms may be recorded with a LWD sonic tool located in the soft formation. A monopole source can excite acoustic waves into the borehole in order to simulate waveforms which may be picked up by a receiver array with, for example, six channels for capturing acoustic fields.

A tool wave package 402 may arrive first with a slowness of 67.5 µs/ft. A second wave package 404 which includes refracted P- and leaky-P waves may arrive after the tool wave package. Stoneley waves may arrive as a third wave package 406. The wave packages 402-406 can be associated with semblance peaks within the semblance map 450.

Semblance peak 452 may be associated with (e.g., generated from) the tool wave package 402. Semblance peak 454 may be associated with the second wave package 404. Likewise, semblance peak 456 may be associated the third wave package 406 of Stoneley waves. For DTC selection, the second wave package 404 may be selected as a target due to its inclusion of both P and leaky-P waves. However, because of the dispersion of leaky-P waves, the wave package 402 can be complicated. Further, due to the dispersion, slowness values associated with high coherences increases with time. The increase of slowness with time is analogous to an increase in phase-slowness with frequency in frequency semblance maps. Rather than taking the slowness value of the most energetic part of the signal (e.g., Airy Phase) as an estimation of slowness, which may bias the slowness estimate away from true formation P-waves (e.g., DTC), a machine-learning methodology can be applied to determine a best slowness estimate.

Figure 5A:
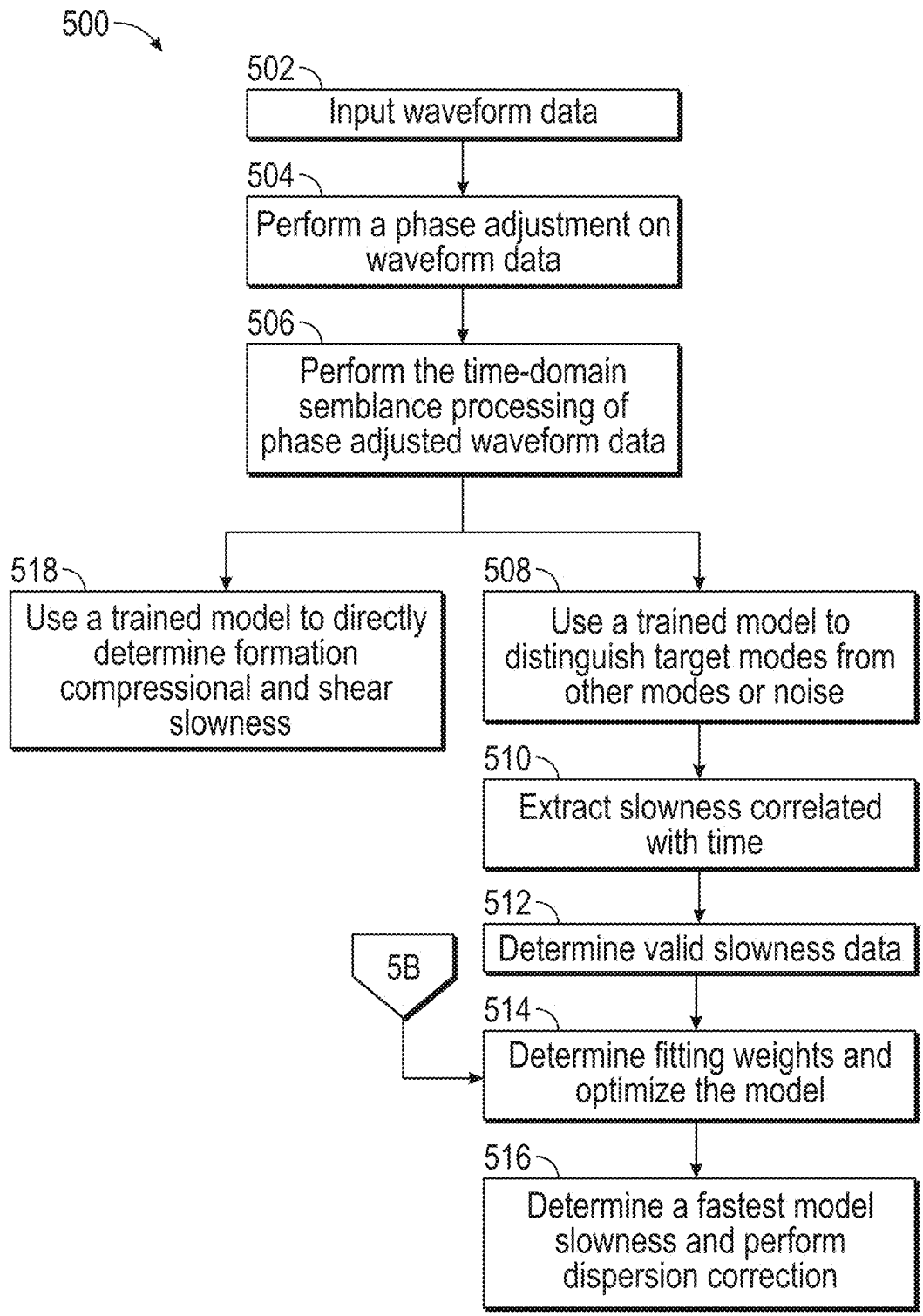
FIG. 5A is a method flowchart for determining a true body wave slowness of a waveform, implementing various embodiments of the present disclosure.

FIG. 5A depicts a modeling constrained processing method 500 for determining a body wave slowness at a target wave package arrival time. Waveform data can be first provided via direct sensors or following preprocessing and the like (operation 502). The waveform data may then be phase adjusted, for example, according to drive-pulse features (operation 504). Further, a time-domain semblance processing can produce a semblance map of slowness over time (e.g., such as semblance map 450 discussed above) from the phase adjusted waveform data (operation 506).

After operation 506, the workflow can go along two separate paths for either direct analysis or for further processing and analysis. Either path involves processing of the semblance map (or multiple semblance maps simultaneously from three different firings). In some embodiments, a trained model (via methods 1500 and 1700 of FIG. 15 and FIG. 17) may directly and simultaneously determine formation compressional and shear slowness via a convolutional neural network (operation 518 via methods 1300 and 1400 in FIG. 13 and FIG. 14). The advantage of this approach is that it does not require dispersion corrections, as such corrections are naturally included in the convolutional neural network.

Figure 6A:
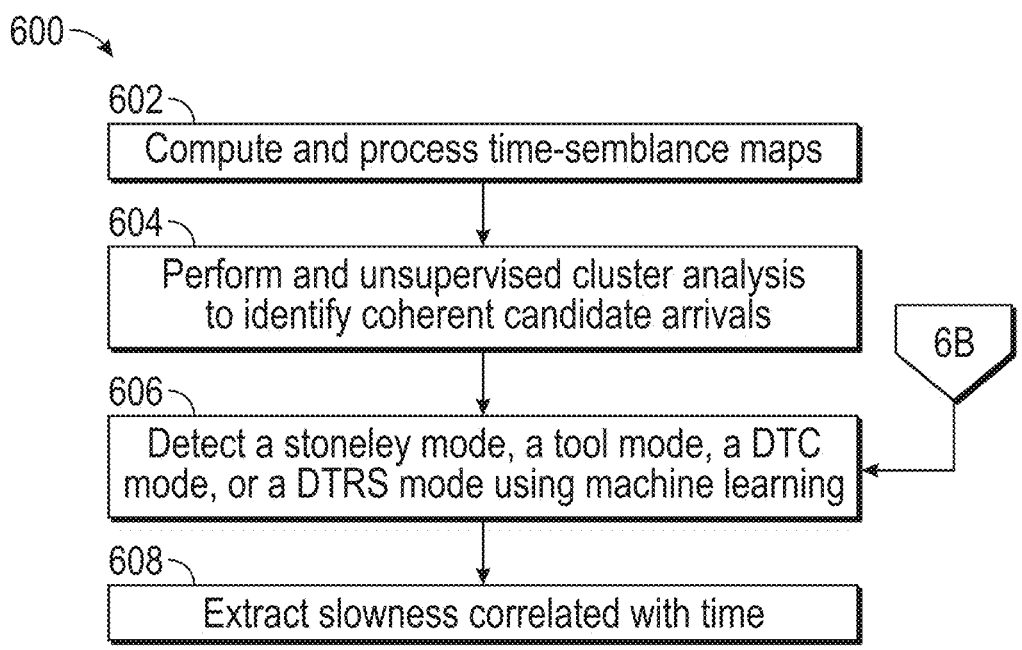
FIG. 6A is a method flowchart for determining a slowness correlated with time, implementing various embodiments of the present disclosure.

In some embodiments, alternatively or additionally, a trained model (via method 650 in FIG. 6B) may be used to distinguish target modes from other modes (operation 508 via method 600 in FIG. 6A). These modes contain measurements that may need a dispersion correction as part of the subsequent body wave slowness determination.

After operation 508, slowness over time measurements associated with the target modes may then also be extracted from the time-domain semblance map (operation 510), and valid slowness data may also be subsequently distinguished (e.g., data not biased by noise or error) (operation 512).

Figure 5B:
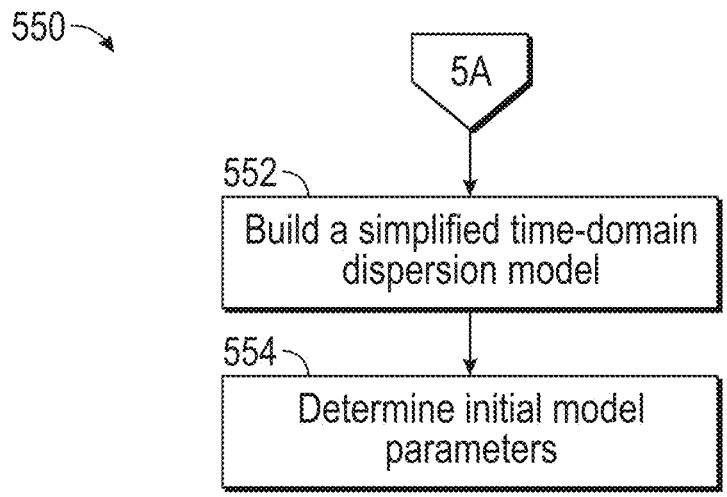
FIG. 5B is a method flowchart for generating an initialized mode, implementing various embodiments of the present disclosure.

In some examples, a model may be initialized concurrent or in addition to the above operations. FIG. 5B depicts one such method 550 for providing an initialized model for processing slowness data produced in method 500.

A simplified time-domain dispersion model of slowness over time (e.g., a slowness-travel time dispersion model) can be built (operation 552). The simplified model may intake, for example, a limited set of features or include a limited number of a parameters and the like. Initial model parameters for the simplified model may then be generated (operation 554). For example, the initial model parameters may be associated to energetic parts of slowness travel time measurements (e.g., from a semblance map and the like). Regardless, the simplified model can then be fed back into the method 500 in order to ultimately produce a slowness estimate.

Returning to FIG. 5A, the valid slowness data can be used to determine fitting weights for optimizing a model (e.g., the model produced by method 550) (operation 514). The weights can be determined from features of the slowness over time data. An inversion-based optimization can then be used to minimize misfit between observed and predicted slowness over time.

Having optimized the model, a fastest model slowness (e.g., predicted by the model) can be determined and, if needed, a modeling-based dispersion correction may be performed (operation 516). In some examples, a weighted (e.g., by the model) observed slowness near the arrival time of a wave package may be output by method 500 instead. Further, the dispersion correction may be made where, for example, an observed dispersion is unexpectedly small in what otherwise is expected to be a dispersive formation. In such a case, a modeling-based dispersion correction may be made based on a pre-computed lookup table.

In some embodiments, operation 518 may include a convolutional neural network (CNN) for providing analysis on either the semblance maps or variable density logs (VDLs) for the slowness of the semblance maps.

Figure 13:
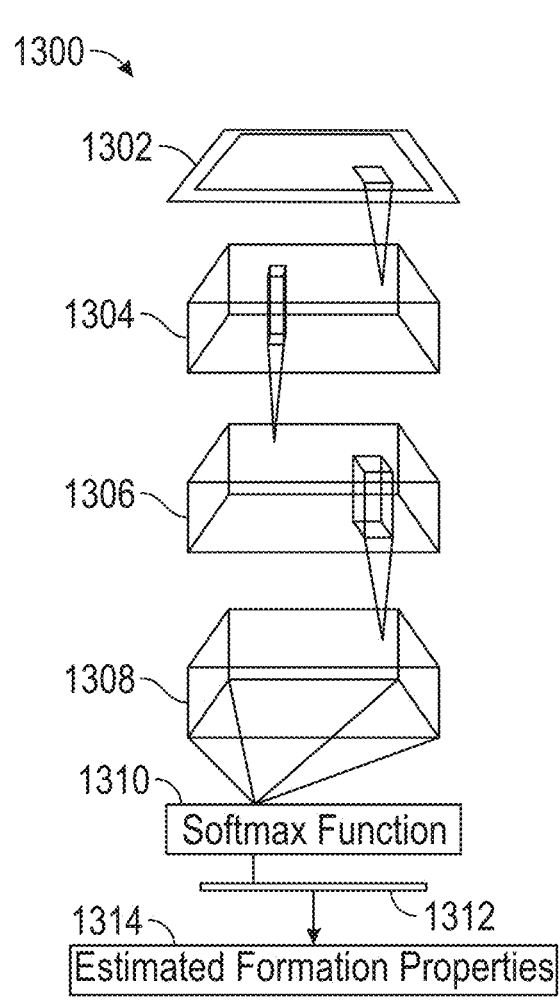
FIG. 13 depicts an example convolutional neural network that works directly with semblance maps, implementing various embodiments of the present disclosure.

FIG. 13 depicts a CNN 1400 for determining formation compressional slowness and/or shear slowness directly from a 2-D semblance map or series of maps corresponding to different excitations of a borehole (e.g., high-frequency monopole, low-frequency monopole, dipole, quadrupole, and the like). A CNN can identify patterns across different spatial and physical scales as well as channels through iteratively processing inputs through a series of layers.

An input map 1302 (e.g., a semblance map produced by operation 506, etc.) may be, for example and without imputing limitation, of spatial dimensions 256×256×3. In this example, the "3" may represent three different channels (e.g., monopole time semblance, dipole frequency semblance, and Stoneley frequency semblance maps). The three channels maps may be convolved with, for example, four different three-dimensional convolutional filters, or one filter (e.g., set of trainable weights) for each of four features that a training process may automatically define. The convolution may be followed by a decimation by "4" (e.g., a stride of "4") in order to reduce unnecessary data redundancy. As a result, dimensionality of the input (e.g., 256×256×3) may be reduced to a size of 64×64×4 in the form of an activation map 1304, where the last dimension denotes a number of feature maps. The values of each pixel may then be passed through a filter, such as a rectified linear unit (ReLU) filter, to truncate negative values to 0.

Two more convolutional layers may further expand the scale of associable features and reduce dimensionality down to 16×16×8 activation maps 1306 and 1308. Pixels in the 16×16×8 activation map 1308 may be connected to a final classification pixel array 1312 of size 2048. Each classification pixel may correspond to a (compressional, shear) formation slowness pair. The pairs can be defined based on, for example, rock physics VpVs relations, which naturally limits the pairs considered. Further, the connections may go through a Softmax function 1310 in order to generate an output value from 0 to 1 (e.g., representing a correlation between training data sets and input data) for classifiers 1312. For example, high values (0.8 to 1) may yield a high confidence that the training data match the observed data well. Classifications 1312 may provide directly, or through additional processing, estimated formation properties 1314. However, high values may not guarantee a unique solution, and so the entire solution space can be mapped out to estimate confidence contours or search for alternative solutions. When such multiple solutions occur, one must take steps to improve the training of the network, which can amount to increasing the number and quality of data sets used for training, performing random drop-outs of pixel connectivities, or changing neural network architecture and the like.

Figure 14:
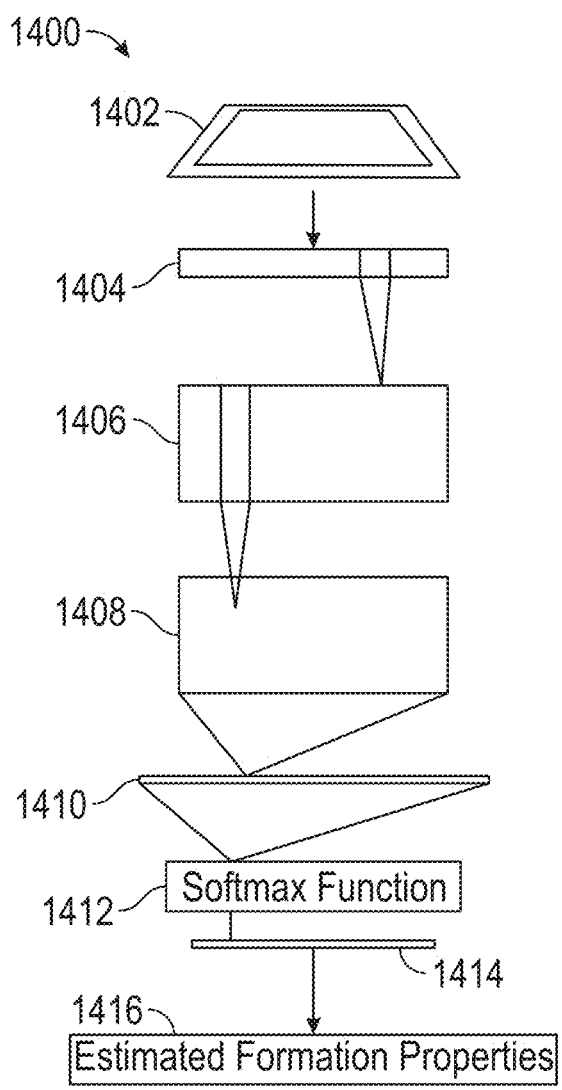
FIG. 14 depicts an example convolutional neural network that works with one-dimensional slowness density functions, implementing various embodiments of the present disclosure.

In comparison, FIG. 14 depicts a CNN 1400 for processing three input semblance maps 1402 first into three one-dimensional (e.g., 1024×3) slowness VDLs 1404 associated with monopole, dipole, and Stoneley firings, respectively. As with CNN 1300, CNN 1400 may include interim activation maps 1406 and 1408 produced by convolutional layers for expanding the scale of associable features derived from 1404, reducing dimensionality, and the like.

In contrast to CNN 1300, CNN 1400 does not consider a time dimension and so sensitivity to variations in integrated travel time may be reduced or eliminated. For many firings, integrated travel time depends significantly on slowness between a transmitter and a first receiver in a receiving array. CNN 1400 can also reduce the amount of CPU time needed to train models and analyze data. Further, CNN 1400 may include a fully connected layer 1410 preceding a Softmax function 1412 which produces an output value for classifiers 1414 to produce estimated formation properties 1416 downstream. However, CNN 1300 may have increased resolution power (relative to CNN 1400) in order to distinguish between, for example, road noise at physically unrealistic arrival times, formation arrivals, and the like.

Figure 15:
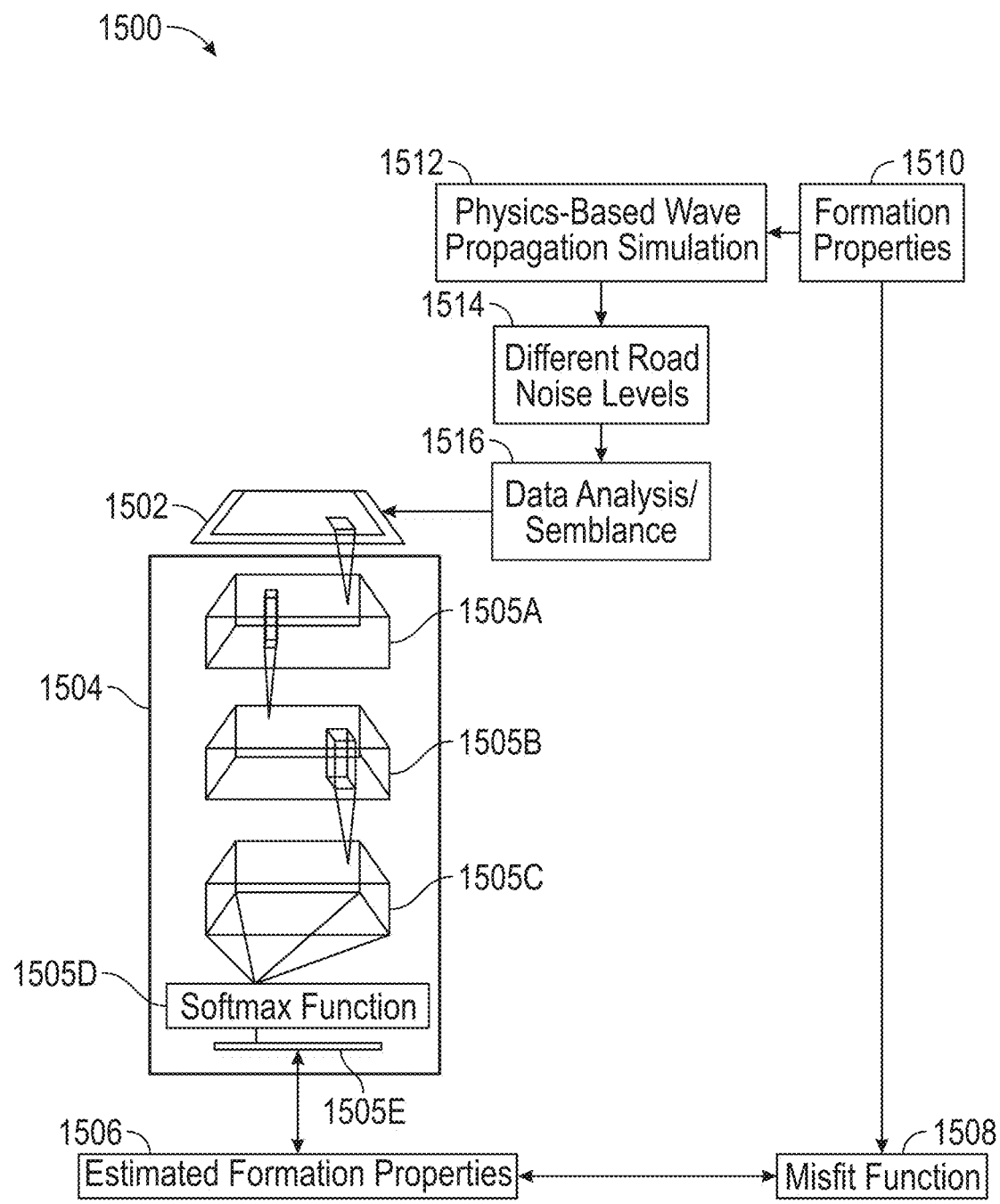
FIG. 15 depicts an example architecture for physics-based training of a convolutional neural network, implementing various embodiments of the present disclosure.
Figure 16A:
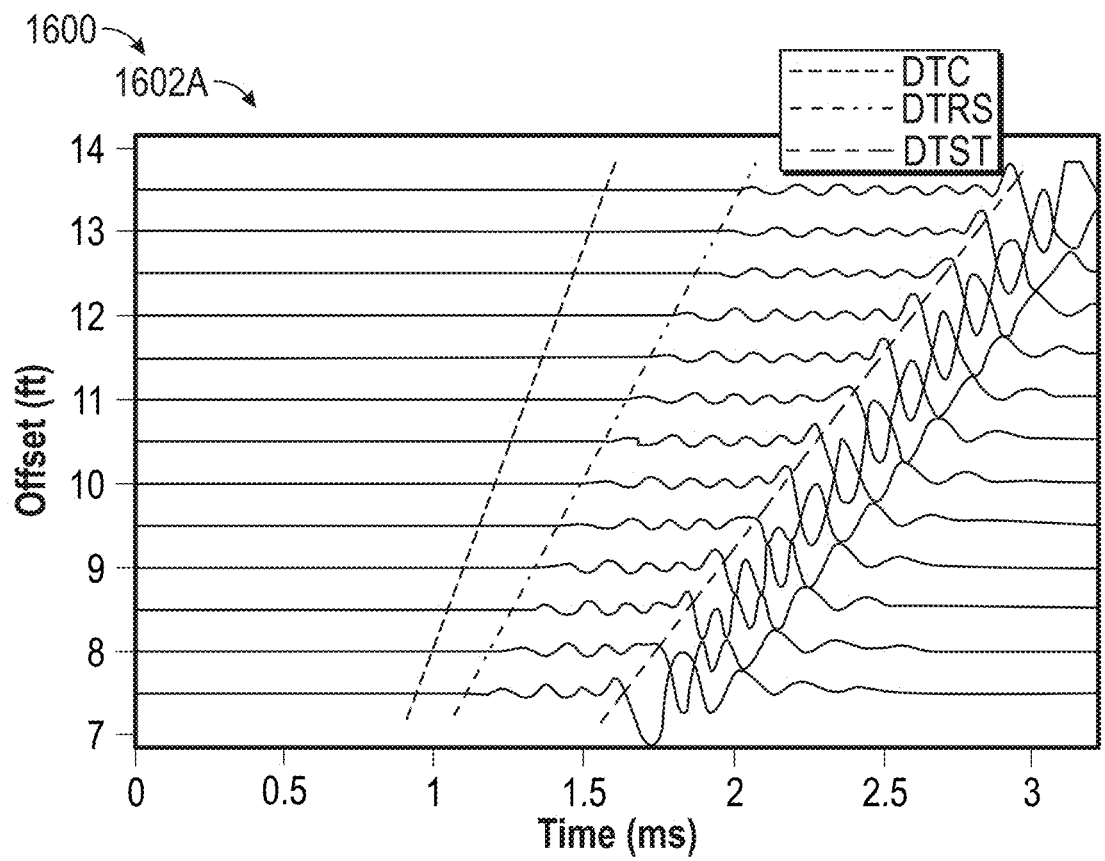
FIG. 16 depicts simulated time semblance maps with different noise levels, implementing various embodiments of the present disclosure.
Figure 16B:
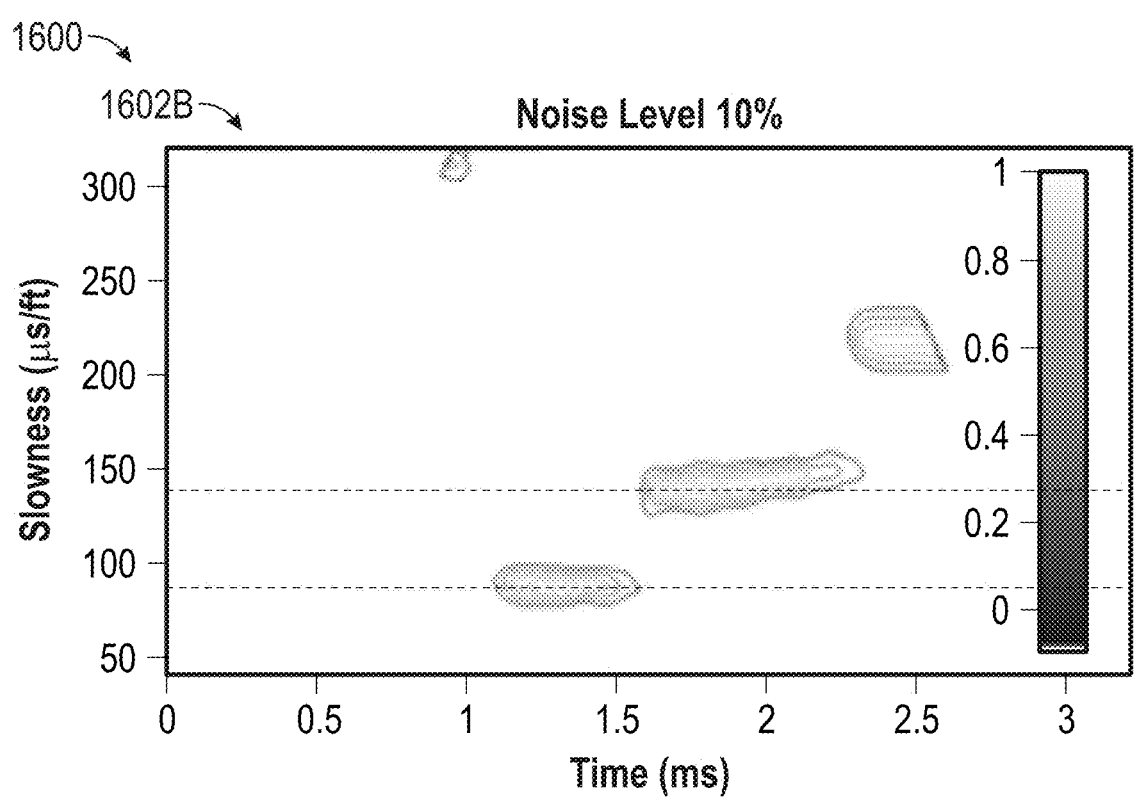
Figure 16C:
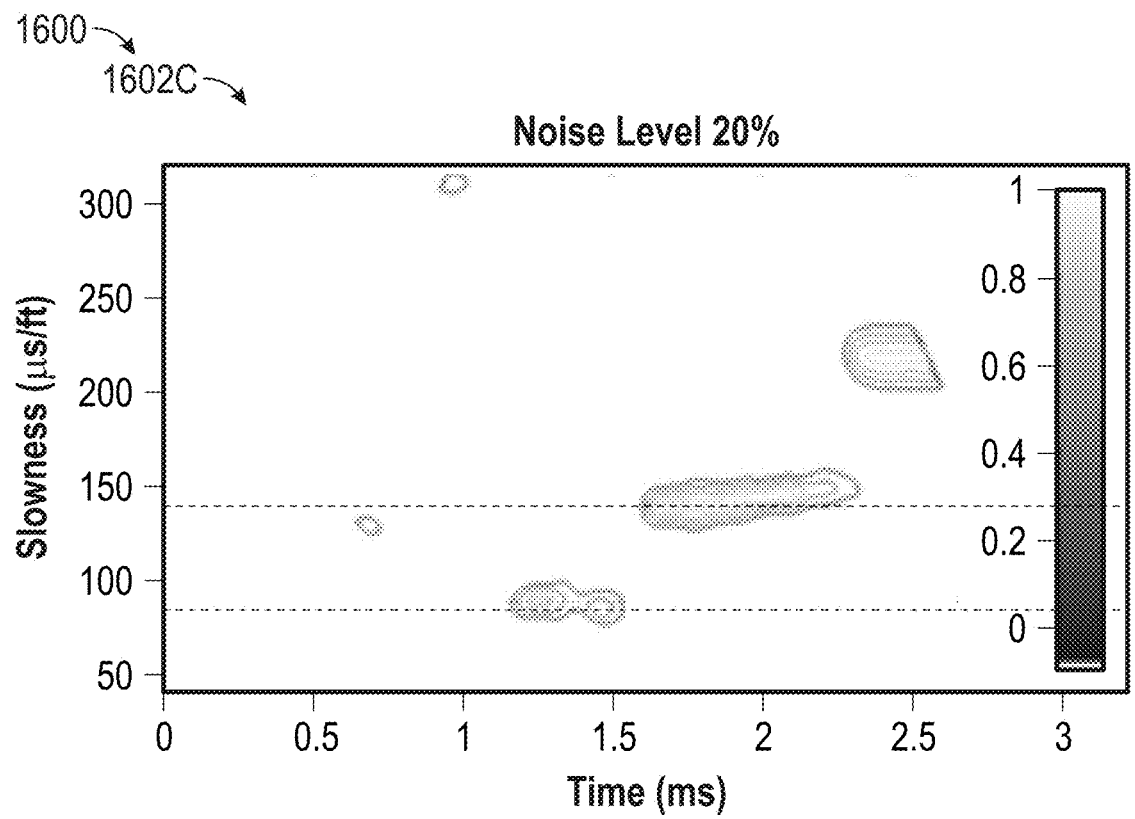
Figure 16D:
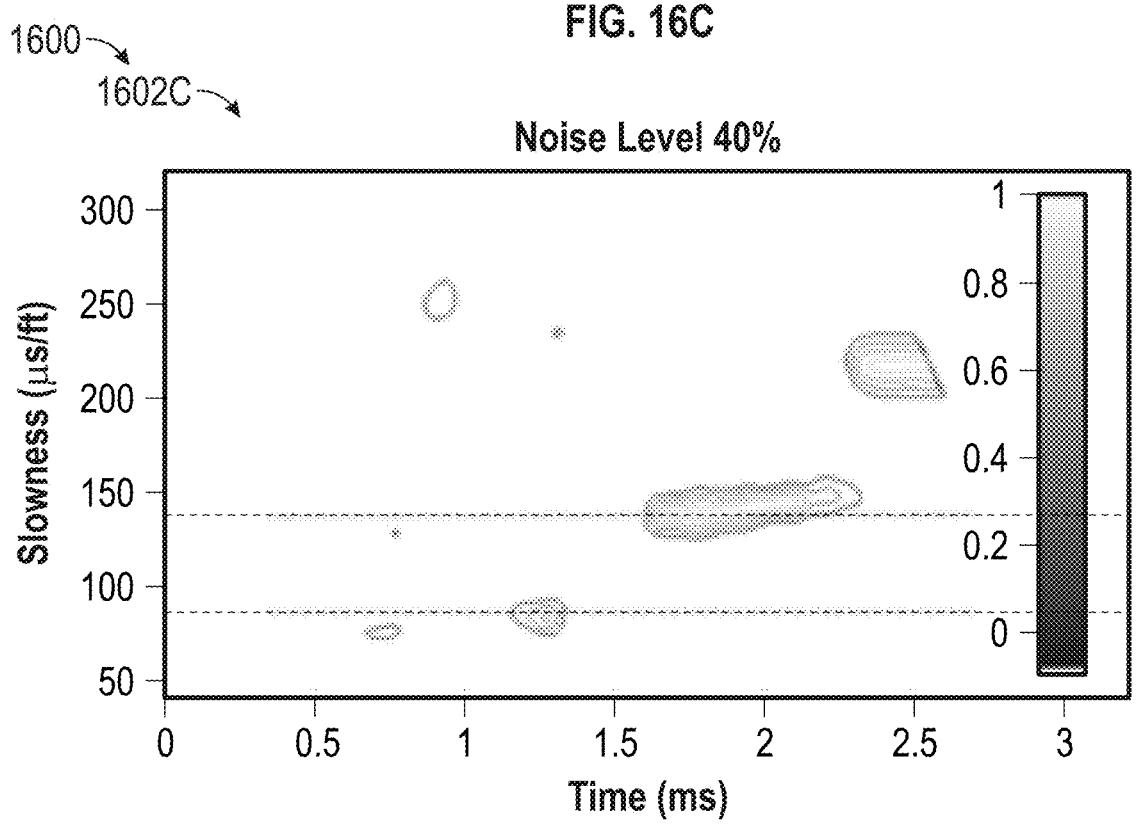
Figure 16E:
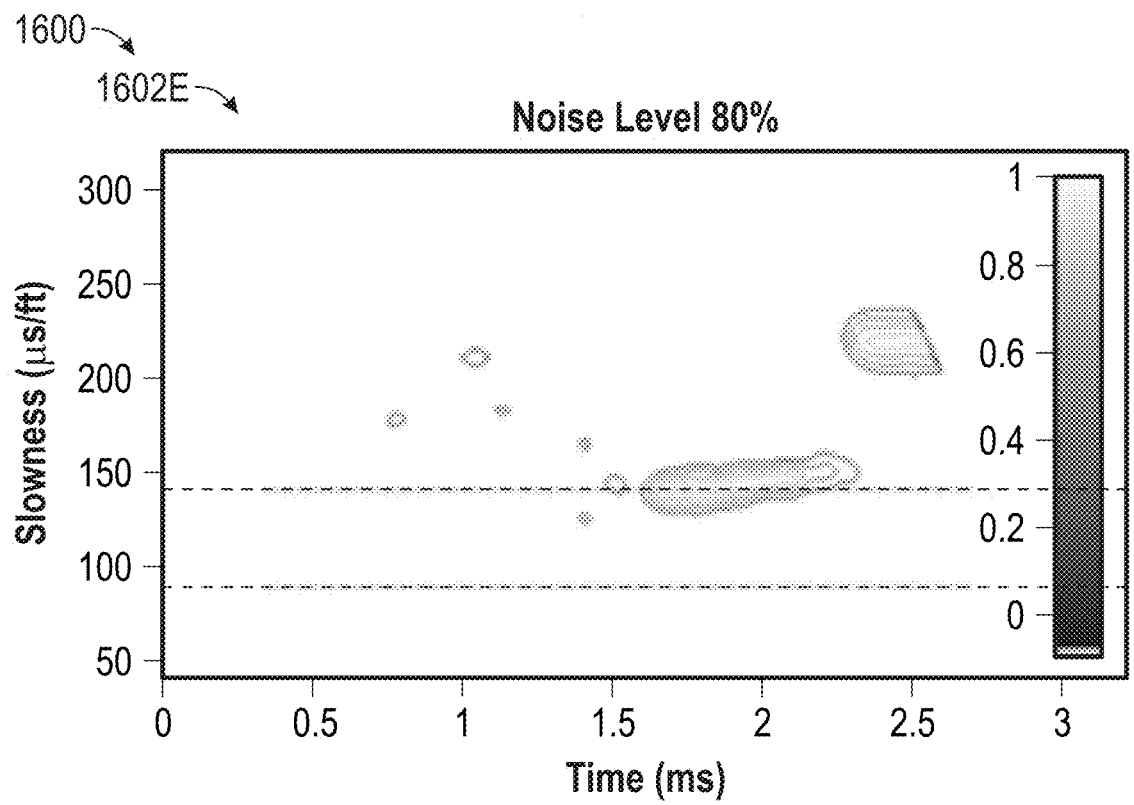
Figure 16F:
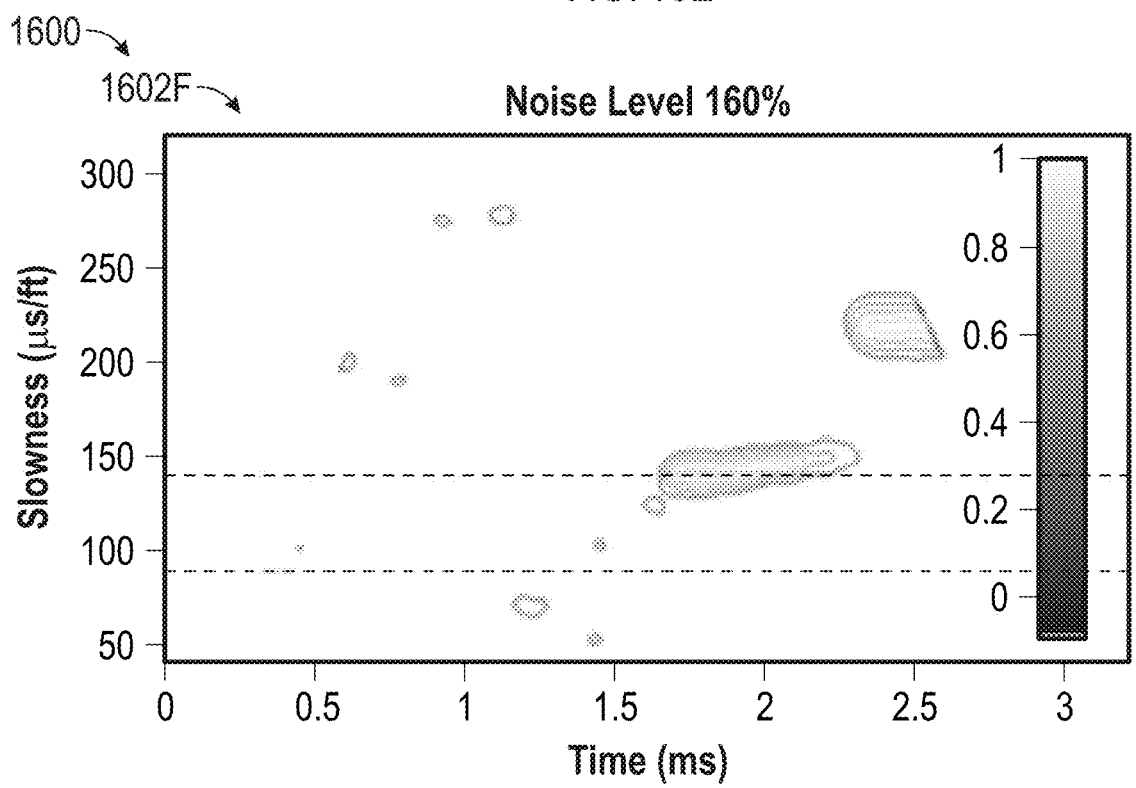

CNNs 1300 and 1400 may have weights and biases between convolutional layers and fully connected layers. FIG. 15 depicts a training method 1500 for producing the weights and biases. As will be understood by a person having ordinary skill in the art, training method 1500 may additionally include various update algorithms such as, for example and without imputing limitation, gradient descent, conjugate gradients, Gauss-Newton, Levenberg-Marquardt, Nelder-Mead, and the like. These update methods may be applied during a "backward propagation" of information from a misfit function between known formation parameters and estimated formation parameters to the weights and biases. Training phases can take several minutes to hours depending on the network architecture, number of training data sets, and available hardware (e.g., laptops, desktop, cloud hosted compute, GPU clusters, and such). Training may be done for a range of permutations of borehole diameter and mud slowness and so an optimally trained network can be used at each depth in the borehole.

Training data may be created from processing semblance maps 1502 that come from full wavefield borehole acoustic simulations with added levels of coherent noise. Semblance maps 1502 may be processed by CNN 1504, which may be architected as described above or otherwise. Here, CNN 1504 iteratively convolves semblance maps 1502 into activation maps 1505A-C and a Softmax function 1505D may filter a final activation map 1505C into output values for classifier 1505E.

Semblance maps 1502 may be produced from simulated (and thus known) formation properties 1510 which are provided to a physics-based wave propagation simulation 1512 and overlaid with different road noise levels 1514 before being fed to a data analysis and semblance analysis 1516. Providing the additive road noise is realistic, the model results are perfectly trained in that no bias would be introduced from uneven sampling of the different permutations of compressional and shear formation slownesses.

A misfit function 1508 can receive both of formation properties 1510 and estimated formation properties 1506. Estimated formation properties may be compared to formation properties 1510 in order to determine, for example, a distance between estimated formation properties 1506 and formation properties 1510. In some examples, a correction can be generated from this error distance and then be provided back to CNN 1504 to propagate throughout the network.

FIG. 16 depicts simulated waveform recordings 1600 from a monopole source in a fast formation. These waveforms 1602A may have coherent noise added to them to produce and be processed to create semblance maps 1602B-F. As a noise floor increases, certain arrivals may become poorly defined or completely absent in the maps 1602B-F. However, other arrivals may be less sensitive to this specific variation in noise, and their insensitivity to noise and correlations in low-noise settings is what may permit their detection by neural networks to accurately predict formation slownesses where slowness/time measurements are missing.

Figure 17:
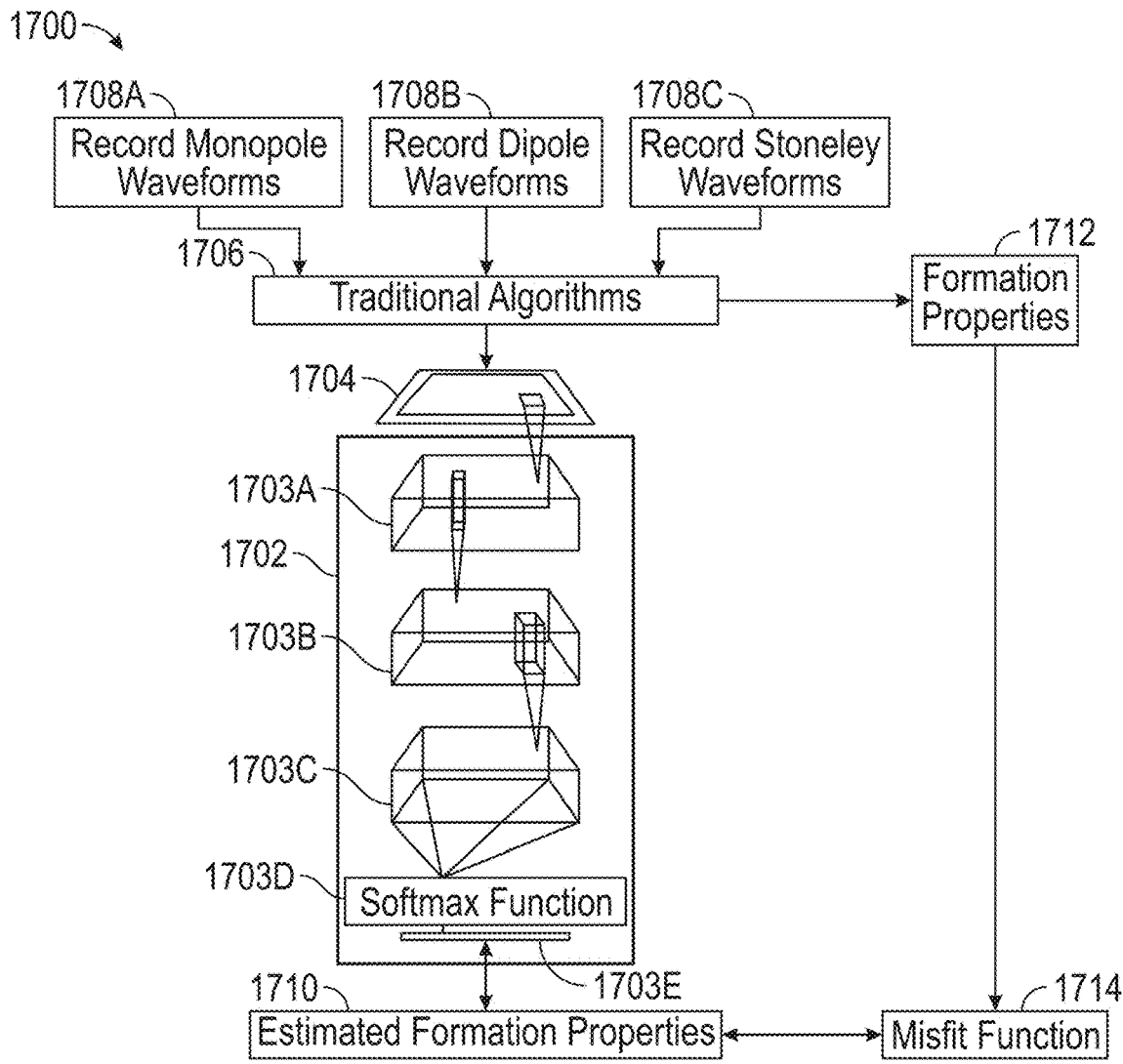
FIG. 17 depicts an example architecture for training a convolutional neural network using existing automated data processing algorithms, implementing various embodiments of the present disclosure.

FIG. 17 depicts a training method 1700 for producing weights and biases for a convolutional neural network with recorded "real" data (e.g., data recorded from onsite and the like). While simulated data has the advantage of providing uniform coverage of all borehole conditions, it can be limited by assumptions made in the wavefield simulation algorithm and in the noise added to the waveforms. For example, simulated wavefields of FIG. 16 may not account for heterogeneity between source and receiver array, which can, for example, greatly affect travel times of arrivals in resultant time semblance maps. Expanding a network to include real data (e.g., from well logs and such) may improve robustness of the trained network. Training data from real wells can come from, for example and without imputing limitation, post-processing efforts after an analyst has completed processing a well manually or automatically from workflows having built-in intelligence, such as those used in real-time applications and the like.

Input data such as monopole waveform records 1708A, dipole waveforms 17088, and Stoneley waveform records 1708C may be provided to an algorithm suite 1706 which may include algorithms for generating a semblance map 1704 as well as calculated formation properties 1712. Similarly to training method 1500, semblance map 1704 may then be fed to a CNN 1702. Neural network 1702 can, for example, be a CNN and iteratively generate activation maps 1703A-C as discussed above, with a final activation map 1703C providing input to a Softmax function 1703D to filter into classifier 1703E. As with the CNNs discussed above, the estimated formation properties 1710 may be output by neural network 1702. Estimated formation properties 1710 may then be provided to a misfit function 1714 which may also receive calculated formation properties 1712 produced by algorithm suite 1706. Misfit function 1714 can calculate an error distance between estimated properties 1710 and calculated formation properties 1712, which may then be propagated as corrections through the CNN 1702 in order to reduce the error distance calculated by misfit function 1714 in later training runs.

Returning to the context of the operation 508, FIGS. 6A and 6B depict methods 600 and 650, respectively, for training and/or deploying a machine learning model to classify modes from a two-dimensional semblance map. In particular, a sequential logistic regression analysis or a neural network receiving feature sets based on wave propagation theory and the like may be used to identify target modes, which can then be used to extract desired sequences of slowness versus time measurements.

Time-semblance maps are first computed and processed (operation 602). In some examples, the time-semblance maps may be synthetic in order to provide training to the model. In other examples, the time-semblance maps may be computed from actual field data and the like. Further, a mix of synthetic and actual time-semblance maps may be used for training purposes.

Unsupervised clustering may be used to identify coherent candidate arrivals (operation 604). For example, arrivals having similar features, such as proximate arrival times and the like, will be identified by the clustering analysis. The identified clusters can then be used to further extract relationships between certain features and arrivals.

For example, machine learning can be further used to detect a Stoneley mode, a tool mode, a compressional refracted mode, or a shear refracted mode in all identified candidate arrivals (operation 606). In some examples, the machine learning used to detect modes can include a trained model produced one time by a supervised methodology and the like. The machine learning can include either a logistic regression or a neural network which is produced by method 650 depicted in FIG. 6A.

FIG. 6B depicts method 650 for generating trained models for identifying various wave modes from semblance maps. Synthetic waveforms for multiple formation types and borehole characteristics (e.g., diameter and the like) may first be produced and noise can be added to the synthetic waveforms (operation 652). The added noise provides a more realistic waveform for training the models to processes, for example, field data and the like.

Time-domain semblance maps may then be generated based on the synthetic waveforms (operation 654). As discussed above, the time-domain may be used for its robustness against noise and the like. The time-domain semblance maps can then undergo unsupervised clustering to identify coherent candidate arrivals (operation 655). In essence, this unsupervised clustering may be similar to the unsupervised clustering of method 600 discussed above. Here, however, the unsupervised clustering is performed on synthetic data and, in some examples, can be performed on a larger range of data due to the ability to synthesize the waveforms.

These clusters may be associated with tool modes, DTC modes, DTRC modes, or Stoneley modes by various processes such as by supervised or unsupervised methodologies (operation 658). Further, based on the cluster associations and semblance map attributes, model coefficients and rules can be generated (operation 660). For example, regression analysis may identify particular attribute values associated with wave mode association or a neural network may identify interrelationships between multiple attributes which can be associated with particular wave mode labels. Nevertheless, and returning to FIG. 6A, slownesses correlated with time can then be extracted based on the clusters and modes detected by the trained models (operation 608).

FIG. 7 depicts a method 700 for performing the dispersion correction (e.g., using the output time/slowness measurements of method 600 discussed above) by a trained machine learning analysis. Modeled datasets, with noise included, may be generated for training the machine learning analysis (operation 702). The modeled datasets can be generated by, for example, forward modeling of data for which true body wave slowness is already known.

For each dataset, a fastest modal slowness can then be determined (operation 704). Method 500 discussed above, for example, can be performed to capture the fastest modal slowness for a dataset (without the final step of performing a dispersion correction). Furthermore, in some examples, a SNR can be extracted from each dataset as well.

Machine learning, such as a neural network or sequential logistic regression and the like, can then be applied to the datasets, extracted slowness values, and SNRs in order to determine relationships between input body wave slowness and estimated fastest modal slowness (operation 706). The relationships, and generated rules related to the relationships, can be stored in a table or other data structure. The relationships may then be applied to log data, fastest modal slowness from field data, and waveform SNRs to generate corrected, or final, body wave slowness values for field data (operation 708). As a result, the modeling constrained processing described above can be used to capture true formation body wave slowness at a target wave package arrival time.

Figure 8:
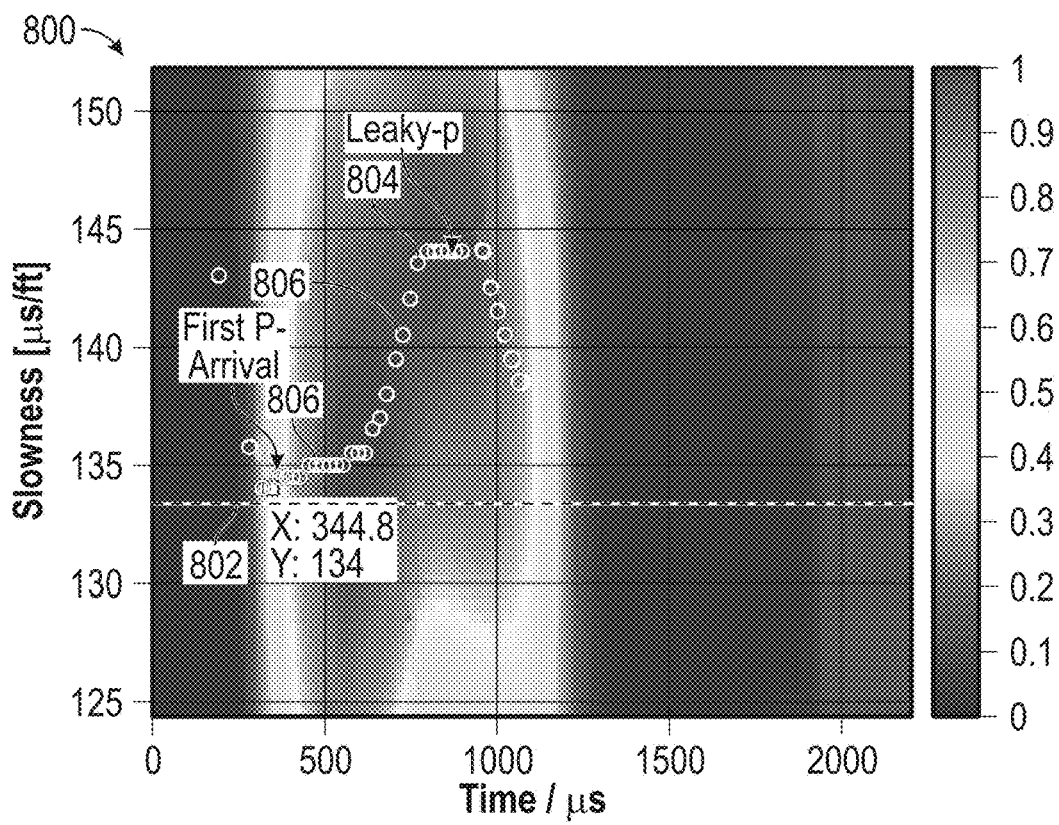
FIG. 8 is a semblance map, implementing various embodiments of the present disclosure.

FIG. 8 depicts a semblance map 800 with a slowness travel time 806 overlay. In particular, semblance map 800 provides details of data and dispersion processing using a monopole firing example (e.g., such as that of FIG. 4). A semblance peak associated with a leaky-P waves is focused upon in the semblance map 800.

Wave signals of different frequencies may have different travel times due to dispersion (e.g., waves with fast slowness might arrive first while slower waves might arrive later, and the like). In effect, refracted compressional waves and leaky-P waves at low frequency asymptotes appear at the beginning 802 of the wave package due to having the fastest slowness among the mapped data.

If signal quality is ideal, slowness at the very beginning 802 of the wave package may be selected as, for example, an estimated formation shear slowness. However, noise and other factors may shift dispersion curves to higher or lower slowness values and so may complicate selecting a slowness curve (e.g., under conventional approaches). The methods disclosed above, however, may use data points between the beginning 802 of the wave package and a maximum slowness trend 804 (e.g., an Airy Phase) to generate a dispersion model for estimating formation compressional slowness associated with a low frequency asymptote.

Figure 9:
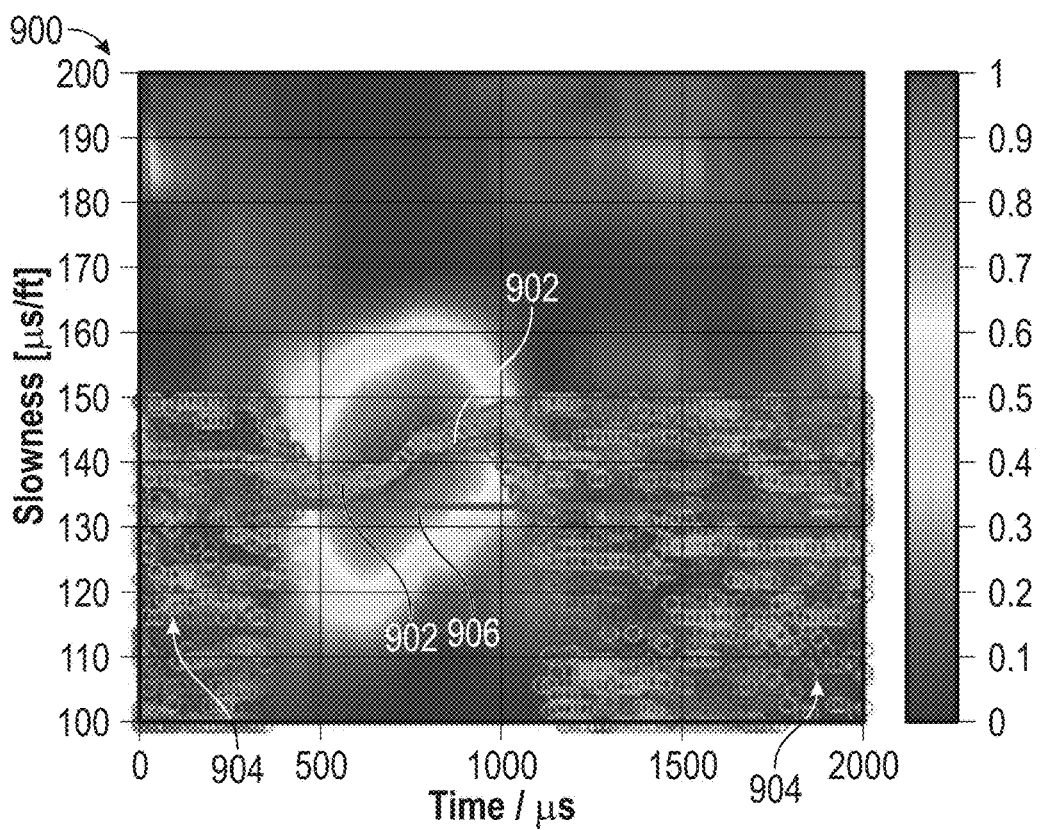
FIG. 9 is a slowness distribution map, implementing various embodiments of the present disclosure.

FIG. 9 depicts a semblance map 900 with random noise 904 added to underlying raw waveform data. Slowness value 906 (e.g., 344.8 of FIG. 8) may be heavily biased by the noise 904 as a result of low amplitude refracted compressional wave and leaky-P waves. In effect, the noise 904 of the data may have significant influence on the first-arrived wave slowness, and, consequently, directly selecting a slowness value from the beginning of the waveform package (e.g., beginning 802) yields biased slowness values.

Full wave packages can be processed in order to overcome the bias. Full wave packages may include higher SNR data (e.g., a stronger signal and/or less noise) at later times. However, slowness values may change with time because of dispersion (e.g., for an impulse source function). Consequently, a mathematical model which compensates for dispersion is needed in order to use higher quality data at later times and higher frequencies.

The mathematical model can be an adaptive time-domain dispersion model constructed using an empirical rule describing dispersion wave propagation. Typically, waves traveling with different slownesses have different arrival times, as will be understood by a person having ordinary skill in the art. Waves with a large group slowness may arrive later, whereas the waves with a low group slowness may arrive earlier (e.g., according to wave propagation theory). A source function can be effectively impulsive such that there are no effects due to a separation of frequencies in the source function with time.

Under those assumptions, slowness associated with travel time reflects group slowness. The group slowness may have a low frequency asymptote and trend that is the same as for a phase slowness of frequencies below an Airy Phase frequency (e.g., model dispersions having slowness close to body wave slowness). Further, dispersions close to body wave slowness and coupled with true refracted compressional or shear waves can form high coherent peaks in semblance maps. Mathematically, this can be approximated by, for example, a hyperbolic tangent function:

$$s(TT) = DT_{body} + (DT_{ref} - DT_{body})\frac{1 + \tanh[\alpha(TT - TT_{ref})]}{2} \quad (1)$$

In equation 1, TT may represent travel time, s(TT) may be the group slowness in the time-domain, $DT_{body}$ can be the formation slowness, $DT_{ref}$ may be a reference slowness of the high frequency asymptote, $TT_{ref}$ may be a reference travel-time value where a derivative of s is at a maximum value, and a can be a parameter controlling a gentleness of a slope.

In comparison, an exponential function may also be used to generate group slowness. The exponential function may be of the form:

$$s(TT)=DT_{body}+(DT_{ref}-DT_{body})\exp[-\alpha(TT-TT_{ref})^\beta],$$
$$\text{for } TT<TT_{ref} \quad (2)$$

In equation 2, β can be a fixed value, and, for explanatory purposes only and without imputing limitation, is discussed in this disclosure as β=2. The exponential function may only predict slowness at travel times lower than $TT_{ref}$.

A sigmoidal function, which yields a similar result to equation 1, may also be used. The sigmoidal function may be of the form:

$$s(TT) = DT_{body} + \frac{(DT_{ref} - DT_{body})}{1 + \exp[-\alpha(TT - TT_{ref})]} \quad (3)$$

The most energetic point or best coherent data point inside a target peak may be selected as a reference slowness and travel-time pair. Any of equations 1-3 and the like can be utilized to predict a slowness-travel-time curve at travel-times before the reference pair. Although in the above equation, $DT_{ref}$ is not the slowness at time $TT_{ref}$, the pair may be used to estimate an initial model upon which an inversion might iterate upon.

Figure 10:
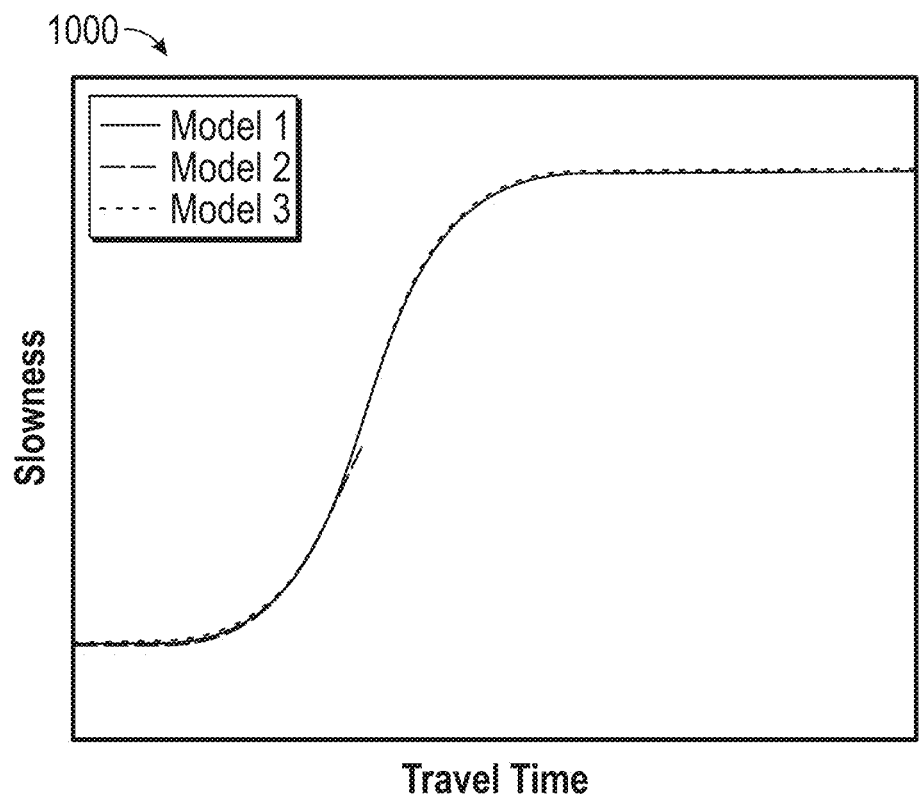
FIG. 10 is a graph of simplified time-domain dispersion models, implementing various embodiments of the present disclosure.
Figure 11A:
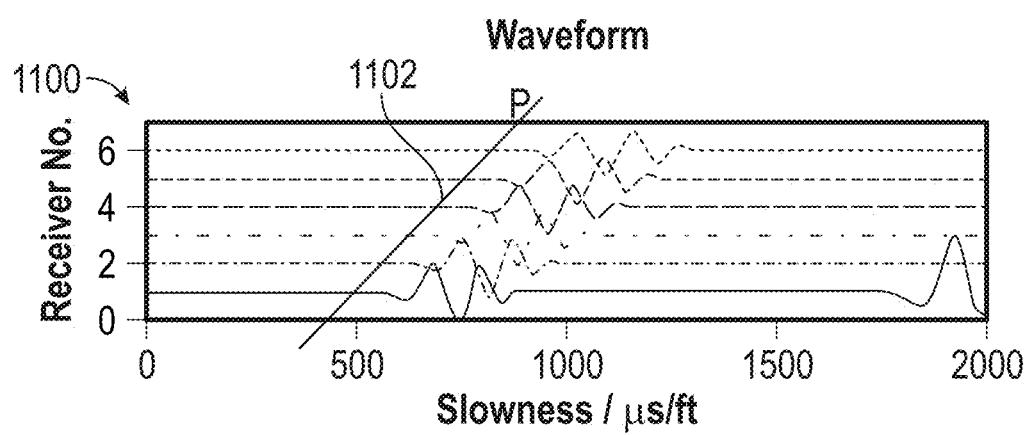
FIG. 11 is an example leaky-P processing result output, implementing various embodiments of the present disclosure.
Figure 11B:
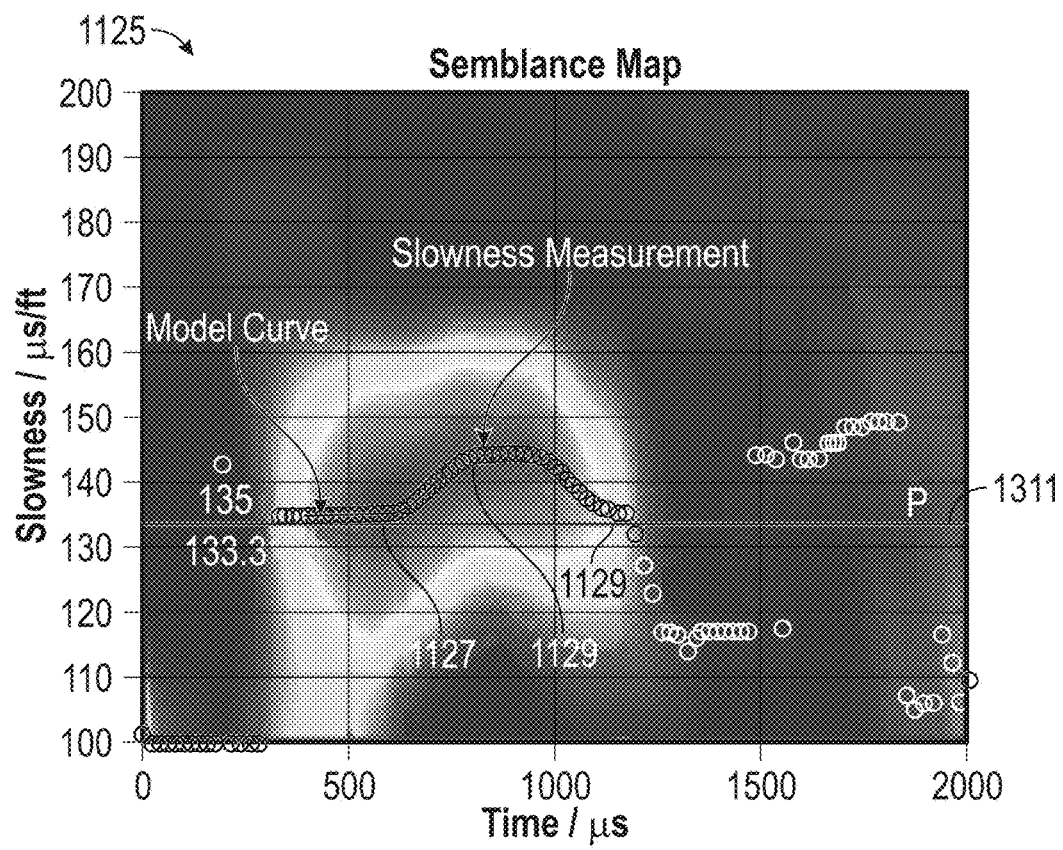
Figure 11C:
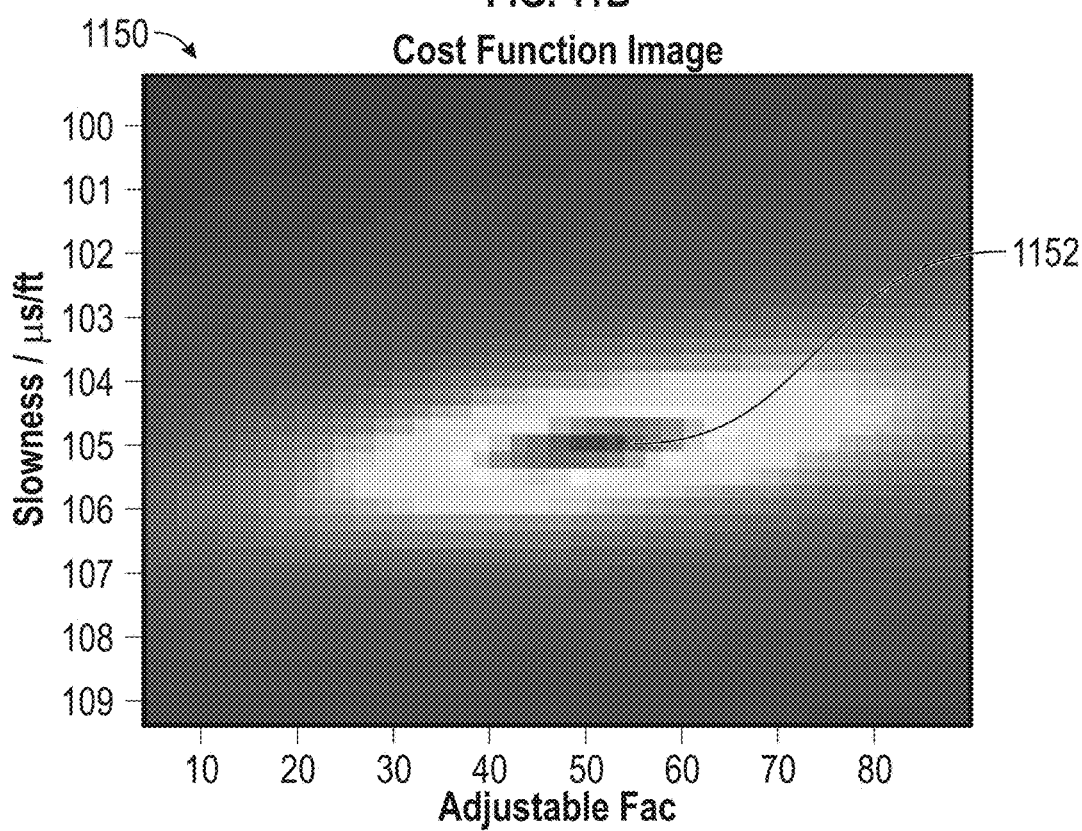
Figure 11D:
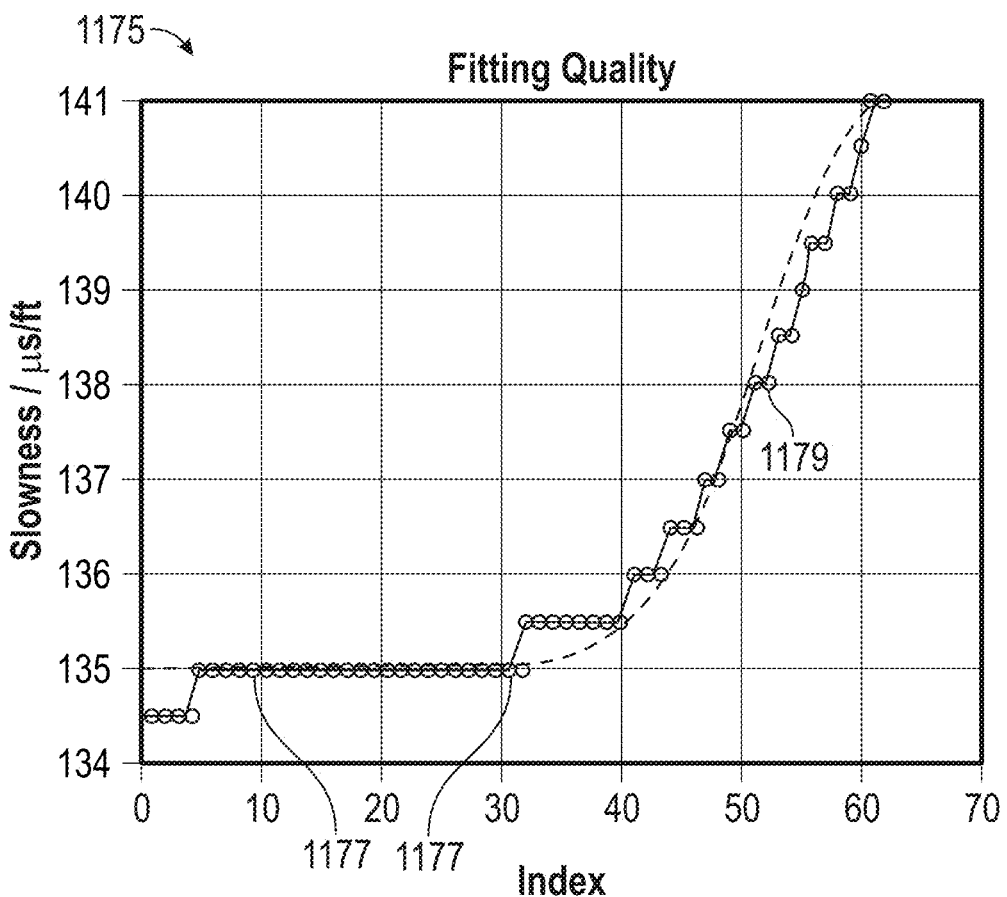
Figure 12A:
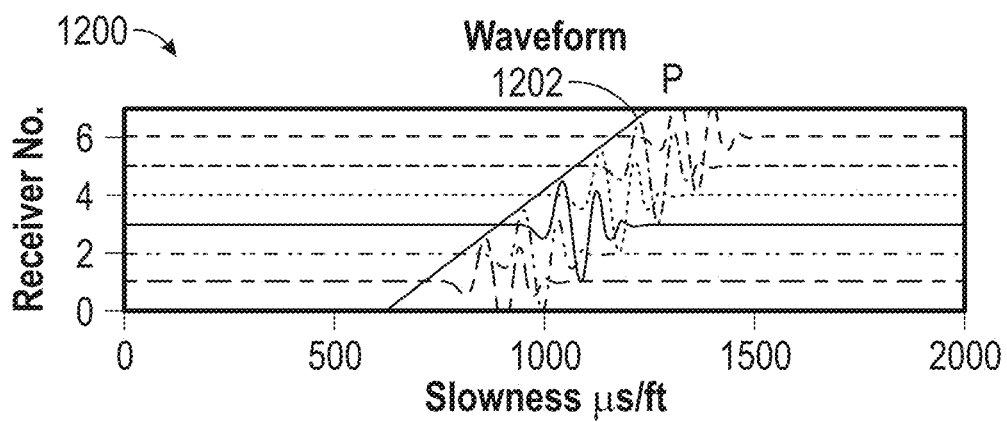
FIG. 12 is an example leaky-P processing result output, implementing various embodiments of the present disclosure.
Figure 12B:
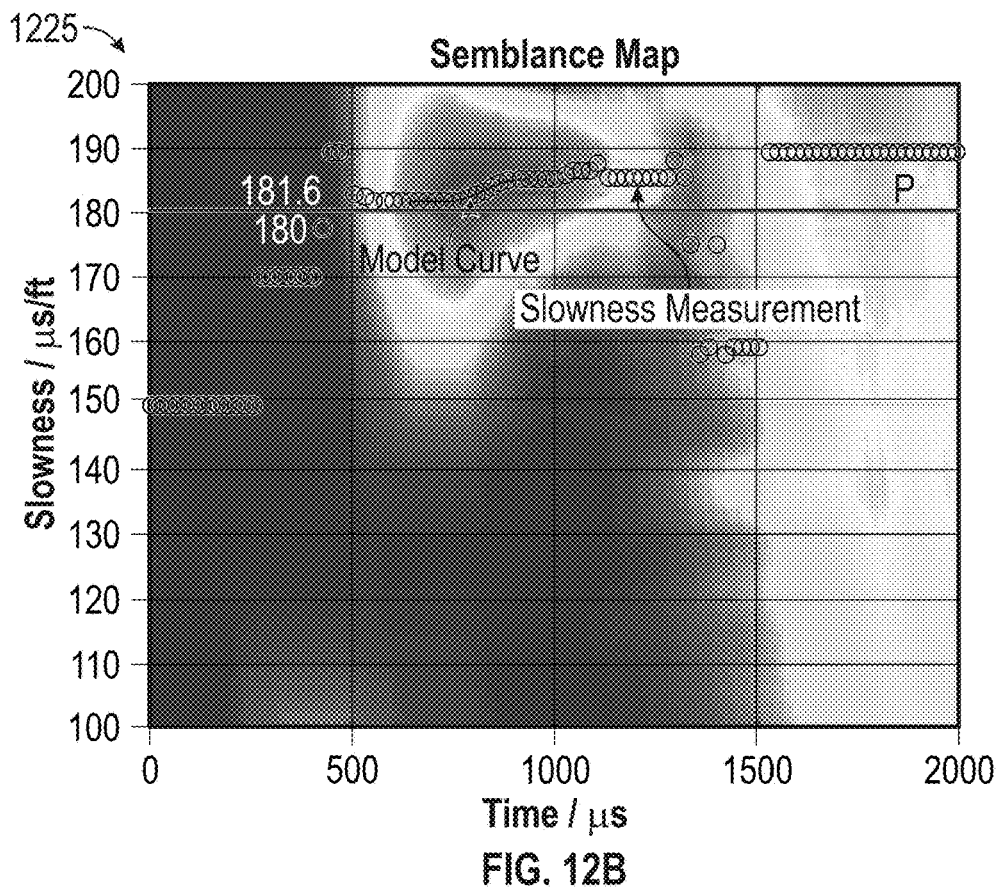
Figure 12C:
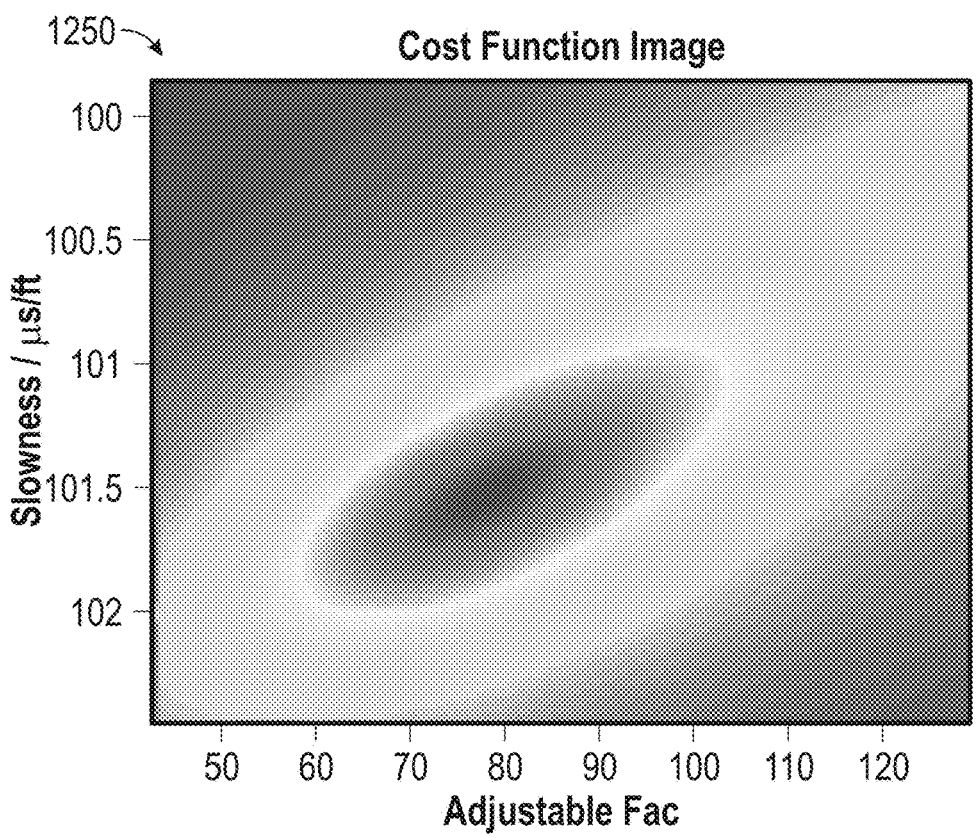
Figure 12D:
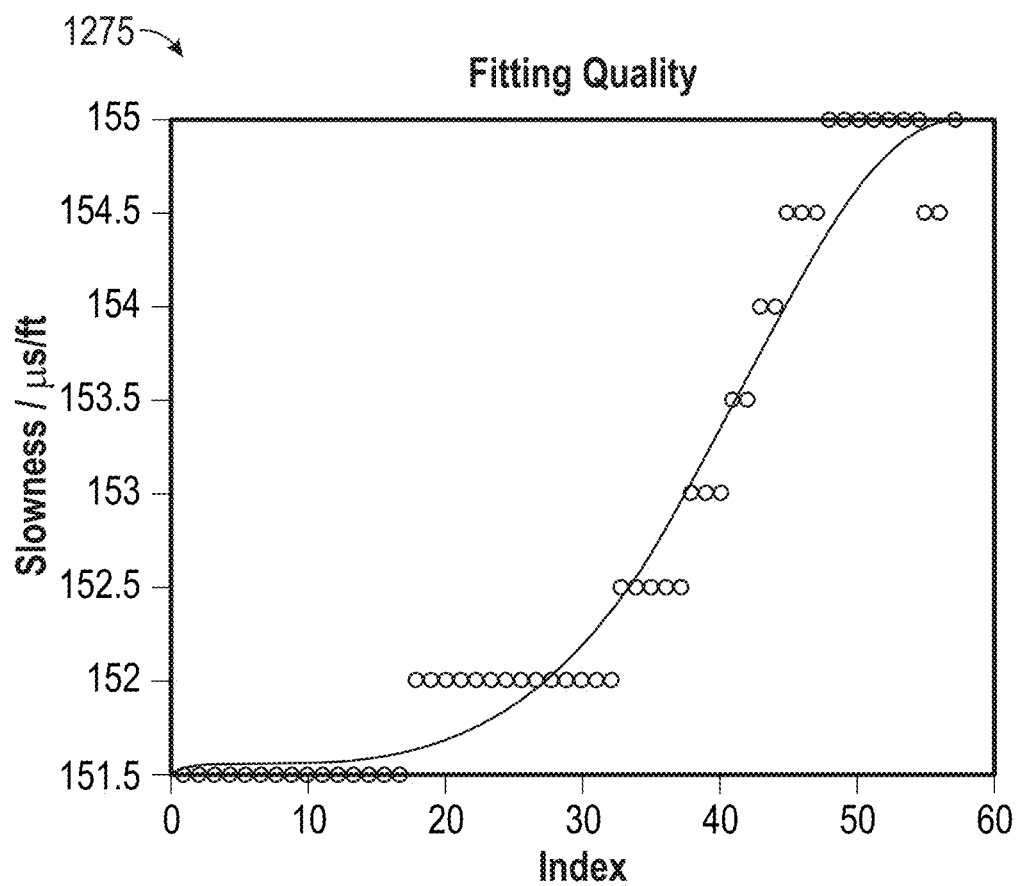

FIG. 10 shows an example of predicted slowness-travel-time curves generated from equations 1-3. The equations capture the features of the time-domain dispersion curve. For example, the predicted slownesses start from a slowness value that is very close to formation slowness, and then changes gently as travel time increases. The predicted slownesses go rapidly to higher values as the most energetic part of the data (e.g., Airy Phase) arrives.

Equations 1-3 and the like may predict slowness-travel-time curves for times prior to a reference time where group and phase velocities have similar asymptotic trends. For example, equations 1-3 may incorrectly bias the result when applied to times associated with the part of the wave train that arrives after the Airy Phase. In some examples, special phase filtering may be used to convert a borehole response from an impulse drive pulse to a response similar to a borehole response from a chirp-like drive pulse (e.g., FIG. 8). The special phase filtering may enable equations 1-3 to be applied to times associated with frequencies above the Airy Phase frequency with less biasing of the result.

After slowness-travel-time measurements are obtained, rules can be used to determine valid data from the measurements. For example, an empirically defined semblance threshold can screen the data. The semblance threshold may be determined with a machine learning analysis applied to field data. Further, an inversion can be applied to optimize the model via, for example, inversion algorithms such as a conjugate gradient and the like. Equation 4 below, for example, may be included in the optimization algorithm.

$$M = \Sigma_{TT} W(TT) |s - s_{near}(TT)|^2 \qquad (4)$$

M may be a misfit or cost function defined by a valid slowness-travel-time measurement, $s_{near}(TT)$ and a weighting function, W(TT). W(TT) may itself be a function of the form:

$$W(TT) = Semb(TT) \qquad (5)$$

Semb(TT) may represent a semblance value of the curve. Data only at travel-times before the reference data point may be utilized for computing the misfit function.

FIG. 11 shows results of the methods discussed above and, in particular, using equation 2 (e.g., the exponential function). Monopole waveforms 1100 can be overlaid by a predicted arrival time for refracted P-waves 1102. A semblance map 1125 can include slowness-travel-time measurements 1129 and a model curve 1127. A cost function image 1150 may indicates minimum misfit 1152 via shading and/or coloring. Further, a fitting quality graph 1175 may display a fitting quality between measurements 1177 and a modeling curve 1179.

The fitting quality graph 1175 shows that the optimum modeling curve correctly captures the features in the slowness-time measurements. The cost function image 1150 shows that a unique solution exists in a searching range and that the inversion is stable. Finally, the slowness value at the arrival time of the peak predicted by the model is picked as estimated compressional slowness 1131 overlaid on the semblance map 1125. The estimated compressional slowness 1131 from leaky-P wave package 1102 is 135 µs/ft and consistent with an input value of 133.3 µs/ft, as also overlaid on semblance map 1125. The small difference between input and output can further be further compensated for with a look-up table generated from forward modeling as discussed above. As an example, and without imputing limitation, equation 6 below may be used to provide a compensation, or correction, for the small difference.

$$\Delta s = f(SNR, DT_{body}, s_{mud}) \qquad (6)$$

Δs may be a correction amount and be produced by a look-up table, $f(SNR, DT_{body}, s_{mud})$, which is itself generated by forward modeling as discussed above. Alternatively, equation 6 might be obtained or optimized by a machine learning analysis as shown in FIG. 7 and discussed above. A training data set can also be obtained from forward modeling data.

Returning to FIG. 9, if the level of noise 904 were higher, then a lower frequency end of a time-slowness curve (e.g., curve 1127) may move later towards the Airy Phase and so reduce the time extent of useful data. Under such a condition, there may be insufficient dispersion to reliably compute the formation slowness without further processing. Consequently, method 700 discussed above may be performed to provide an additional dispersion correction for application to the most reliable slowness in the observed slowness-time data.

FIG. 12 presents an example similar to FIG. 11, and includes waveforms 1200, semblance map 1225, a cost function image 1250, and a fitting quality graph 1275. However, semblance map 1225 includes a much slower formation 1233. In particular, the input slowness is 180 µs/ft, which agrees with 2% of the input value 181.6 µs/ft. Additionally, both the fitting quality graph 1275 and the cost function image 1250 show that the model is accurate and the method works well for estimating DTC from a leaky-P wave package 1202.

Figure 18:
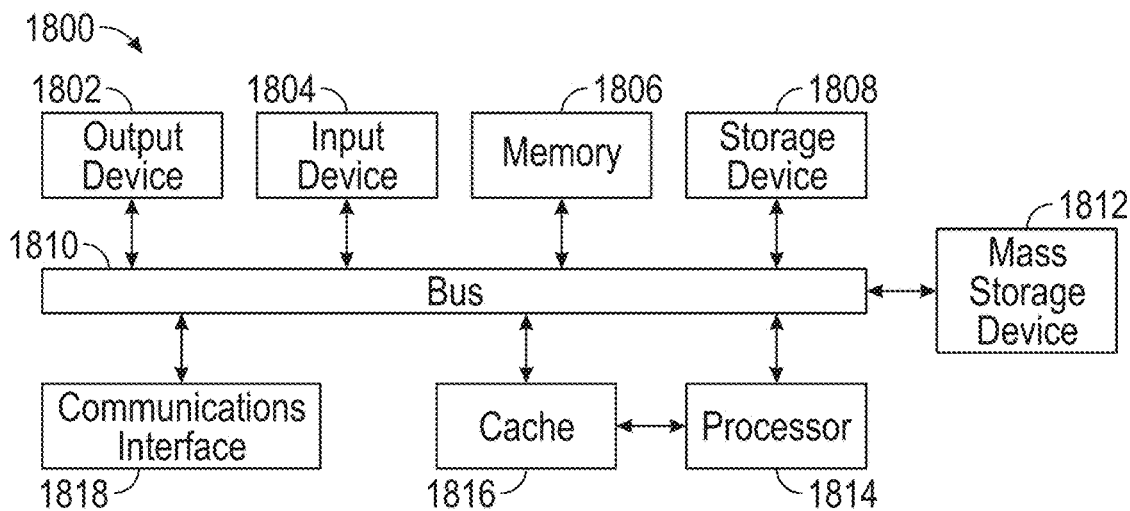
FIG. 18 is a schematic diagram of an example system which may be used in implementing various embodiments of the present disclosure.

FIG. 18 is a schematic diagram of a computing system 1800 that may implement various systems and methods discussed herein. The computing system 1800 includes one or more computing components in communication via a bus 1810. In one embodiment, the computing system 1800 may include one or more processor 1814. The processor 1814 can include one or more internal levels of cache 1816 and a bus controller or bus interface unit to direct interaction with the bus 1810. The processor 1814 can specifically implement the various methods discussed herein. Memory 1806 may include one or more memory cards and a control circuit, or other forms of removable memory, and can store various software applications including computer executable instructions, that when run on the processor 1814 implement the methods and systems set out herein. Other forms of memory, such as a storage device 1808 and a mass storage device 1812, can also be included and accessible by the processor (or processors) 1814 via the bus 1810. The storage device 1808 and mass storage device 1812 can each contain any or all of the methods and systems, in whole or in part, discussed herein. In some examples, the storage device 1808 or the mass storage device 1812 can provide a database or repository in order to store data as discussed below.

The computing system 1800 can further include a communications interface 1818 by way of which the computing system 1800 can connect to networks and receive data useful in executing the methods and systems set out herein as well as transmitting information to other devices. The computer system 1800 can also include an input device 1804 by which information is input. Input device 1804 can be a scanner, keyboard, and/or other input devices as will be apparent to a person of ordinary skill in the art. Similarly, the computer system 1800 can also include an output device 1802 which can be a monitor, data feed, application programming interface (API) hook, and other output devices and systems as will be apparent to a person of ordinary skill in the art. The system set forth in FIG. 18 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

Numerous examples are provided herein to enhance understanding of the present disclosure. A specific set of statements are provided as follows.

Statement 1: A method is disclosed for borehole wave processing, the method comprising: obtaining, by an acoustic logging tool within a borehole passing through a formation, an acoustic wave; processing a semblance from the acoustic wave; extracting a slowness-travel time measurement from the a semblance; optimizing a slowness-travel time dispersion model by decreasing a misfit between the slowness-travel time dispersion model and the slowness-travel time measurement; and determining a formation body wave slowness from a curve of the optimized model.

Statement 2: A method is disclosed according to any of the preceding Statements, further comprising building a simplified slowness-travel time dispersion model by processing formation characteristics of a borehole environment and limiting which features are received by the slowness-travel time dispersion model to generate the simplified slowness-travel time dispersion model.

Statement 3: A method is disclosed according to Statement 2, further comprising: forward modeling slowness-travel time dispersion based on the processed formation characteristics; generating the slowness-travel time dispersion model based on a look-up table, the look-up table based on the forward modeling; determining an approximate mathematical relation for the slowness-travel time dispersion model; and building the simplified slowness-travel time dispersion model based at least in part on the approximate mathematical relation.

Statement 4: A method is disclosed according to any of the preceding Statements, further comprising: generating an initial guess according to a feature measurement, the feature measurement based on a property of the received acoustic wave; adjusting a first parameter of the slowness-travel time dispersion model based on the initial guess; and determining one of the first parameter or a second parameter for minimizing the misfit.

Statement 5: A method is disclosed according to any of the preceding Statements, further comprising: determining a formation body wave slowness at a specific arrival time based on one of the slowness-travel time dispersion model or observed slowness-time curves; and performing a correction of the determined formation body wave slowness, the correction based on a look-up table.

Statement 6: A method is disclosed according to any of the preceding Statements, further comprising: generating a number of model datasets; determining, for each of the model datasets, a fastest modal slowness; producing, through a machine learning analysis, a relationship between a true input body wave slowness and the determined fastest modal slowness; and performing a final correction to get a final body slowness estimate.

Statement 7: A method is disclosed according to any of the preceding Statements, further comprising: classifying a target mode using machine learning analysis of the acoustic wave; and processing the semblance based at least in part on the classified target mode.

Statement 8: A method is disclosed according to Statement 7, wherein the machine learning analysis includes one of a sequential logistic regression or a neural network.

Statement 9: A method is disclosed according to any of the preceding Statements, wherein the obtained acoustic wave comprises one of monopole waves, dipole waves, quadrupole waves, or any combination thereof.

Statement 10: A method is disclosed according to any of the preceding Statements, further comprising adjusting a downhole operational parameter based at least in part on the formation body wave slowness, the operational parameter one of a drilling parameter, a logging parameter, a completion parameter, or a production parameter.

Statement 11: A method is disclosed according to any of the preceding Statements, wherein processing the semblance further comprises determining signal properties of the obtained acoustic wave, the signal properties in one of a time domain, a frequency domain, a coherence value, an amplitude, an instantaneous frequency, a signal-to-noise ratio, or any combination thereof.

Statement 12: A non-transitory computer readable medium is disclosed which stores instructions that, when executed by one or more processors, cause the one or more processors to: obtain, by an acoustic logging tool within a borehole passing through a formation, an acoustic wave; process a semblance from the received acoustic wave; extract a slowness-travel time measurement from the semblance; optimize a slowness-travel time dispersion model by decreasing a misfit between the slowness-travel time dispersion model and the slowness-travel time measurement; and determine a formation body wave slowness from a curve of the optimized model.

Statement 13: A non-transitory computer readable medium is disclosed according to Statement 12, further storing instructions that, when executed by one or more processors, cause the one or more processors to: forward model slowness-travel time based on the processed formation characteristics; generate the slowness-travel time dispersion model based on a look-up table, the look-up table based on the forward modeling; determine an approximate mathematical relation for the slowness-travel time dispersion model; and build a simplified slowness-travel time dispersion model by processing formation characteristics of a borehole environment and limiting which features are received by the slowness-travel time dispersion model to generate the simplified slowness-travel time dispersion model, the slowness-travel time dispersion model based at least in part on the approximate mathematical relation.

Statement 14: A non-transitory computer readable medium is disclosed according to any of preceding Statements 12-13, further storing instructions that, when executed by one or more processors, cause the one or more processors to: determine a formation body wave slowness at a specific arrival time based on one of the slowness-travel time dispersion model or observed slowness-time curves; and perform a correction of the formation body wave slowness, the correction based on a look-up table.

Statement 15: A non-transitory computer readable medium is disclosed according to any of preceding Statements 12-14, further storing instructions that, when executed by one or more processors, cause the one or more processors to: generate a number of model datasets; determine, for each of the model datasets, a fastest modal slowness; produce, through a machine learning analysis, a relationship between a true input body wave slowness and the determined fastest modal slowness; and perform a final correction to get a final body slowness estimate.

Statement 16: A non-transitory computer readable medium is disclosed according to any of preceding Statements 12-15, further storing instructions that, when executed by one or more processors, cause the one or more processors to classify a target mode for extracting slowness-time measurements using machine learning analysis, the machine learning analysis including one of a sequential logistic regression or a neural network.

Statement 17: A non-transitory computer readable medium is disclosed according to any of preceding Statements 12-16, further storing instructions that, when executed by one or more processors, cause the one or more processors to adjust a downhole operational parameter based at least in part on the formation body wave slowness, the operational parameter one of a drilling parameter, a logging parameter, a completion parameter, or a production parameter.

Statement 18: A non-transitory computer readable medium according to any of preceding Statements 12-17, wherein the obtained acoustic wave comprises one of monopole waves, dipole waves, quadrupole waves, or any combination thereof.

Statement 19: A non-transitory computer readable medium according to any of preceding Statements 12-18, wherein processing the semblance further comprises determining signal properties of the obtained acoustic wave, the signal properties in one of a time domain, a frequency domain, a coherence value, an amplitude, an instantaneous frequency, a signal-to-noise ratio, or any combination thereof.

Statement 20: A method is disclosed for borehole wave processing, the method comprising: obtaining, by an acoustic logging tool within a borehole passing through a formation, an acoustic wave; determining signal properties of the acoustic wave; generating one or more semblance maps based on the acoustic wave based on the determined signal properties; and determining, by a trained model, formation body wave compressional and shear slownesses based on at least one of the one or more semblance maps or the determined signal properties.

Statement 21: A method is disclosed according to Statement 20, wherein the acoustic wave comprise one or more of monopole waves, dipole waves, or quadrupole waves.

Statement 22: A method is disclosed according to Statement 21, wherein at least one of the one or more semblance maps or the determined signal properties are associated with one of a time domain or a frequency domain.

Statement 23: A method is disclosed according to any of preceding Statements 20-22, wherein one of the one or more semblance maps comprises a 1-D projection of information across one of a time axis or a frequency axis.

Statement 24: A method is disclosed according to any of preceding Statements 20-23, wherein the one or more semblance maps include one of coherence, amplitude, instantaneous frequency, or signal-to-noise ratio.

Statement 25: A method of is disclosed according to any of preceding Statements 20-24, wherein the trained model comprises a convolutional neural network and is trained using supervised machine learning.

Statement 26: A method is disclosed according to Statement 25, wherein the training method includes one of human labeling, automated labeling from other algorithms, physics-based wavefield simulation data.

Statement 27: A method is disclosed according Statement 25, wherein the physics-based wavefield simulation data comprises multiple levels of noise and each level is based on one of a noise model or recordings of road noise by an acoustic receiver.

Statement 28: A method is disclosed according to Statement 27, further comprising determining, by one of the trained model or a second trained model, one of borehole fluid slowness or anisotropy parameters.

Statement 29: A method is disclosed to any of preceding Statements 20-28, further comprising mathematically rotating into a coordinate system waveforms of the acoustic wave, the coordinate system aligning with a fast direction and a slow direction.

Statement 30: A non-transitory computer readable medium is disclosed which comprises instructions that, when executed by one or more processors, cause the one or more processors to: obtain, by an acoustic logging tool within a borehole passing through a formation, an acoustic wave; determine signal properties of the acoustic wave; generate one or more semblance maps based on the acoustic wave based on the determined signal properties; and determine, by a trained model, formation body wave compressional and shear slownesses based on at least one of the one or more semblance maps or the determined signal properties.

Statement 31: A non-transitory computer readable medium is disclosed according to Statement 30, wherein the acoustic wave comprises one or more of monopole waves, dipole waves, or quadrupole waves.

Statement 32: A non-transitory computer readable medium is disclosed according any of preceding Statements 30-31, wherein the at least one of the one or more semblance maps or the determined signal properties is associated with one of a time domain or a frequency domain.

Statement 33: A non-transitory computer readable medium according to any of preceding Statements 30-32, wherein one of the one or more semblance maps comprises a 1-D projection of information across one of a time axis or a frequency axis.

Statement 34: A non-transitory computer readable medium is disclosed according to any of preceding Statements 30-33, wherein the one or more semblance maps include one of coherence, amplitude, instantaneous frequency, or signal-to-noise ratio.

Statement 35: A non-transitory computer readable medium is disclosed according to any of preceding Statements 30-34, wherein the trained model comprises a convolutional neural network and is trained using supervised machine learning.

Statement 36: A non-transitory computer readable medium is disclosed according to Statement 35, wherein the training of the machine learning includes one of human oversight, automated outputs of workflows, or physics-based wavefield simulation data.

Statement 37: A non-transitory computer readable medium is disclosed according to Statement 36, wherein the physics-based wavefield simulation data comprises multiple levels of noise and each level is based on one of a noise model or recordings of road noise by an acoustic receiver.

Statement 38: A non-transitory computer readable medium according to any of preceding Statements 30-37, further comprising instructions to determine, by one of the trained model or a second trained model, one of borehole fluid slowness or anisotropy parameters.

Statement 39: A non-transitory computer readable medium is disclosed according to any of preceding Statements 30-38, further comprising instructions to mathematically rotate into a coordinate system waveforms of the acoustic wave, the coordinate system aligning with a fast direction and a slow direction.

The description above includes example systems, methods, techniques, instruction sequences, and/or computer program products that embody techniques of the present disclosure. However, it is understood that the described disclosure may be practiced without these specific details.

While the present disclosure has been described with references to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various examples of the disclosure or described with different terminology. These and other variations, modifications, additions, and improvements may fall within the scope of the disclosure as defined in the claims that follow.

What is claimed is:

1. A method for borehole wave processing, the method comprising:
    obtaining, by an acoustic logging tool within a borehole passing through a formation, an acoustic wave;
    processing a semblance from the acoustic wave;
    extracting a slowness-travel time measurement from the semblance;
    optimizing a slowness-travel time dispersion model by decreasing a misfit between the slowness-travel time dispersion model and the slowness-travel time measurement; and
    determining a formation body wave slowness from a curve of the optimized model.

2. The method of claim 1, further comprising building a simplified slowness-travel time dispersion model by processing formation characteristics of a borehole environment and limiting which features are received by the slowness-travel time dispersion model to generate the simplified slowness-travel time dispersion model.

3. The method of claim 2, further comprising:
    forward modeling slowness-travel time dispersion based on the processed formation characteristics;
    generating the slowness-travel time dispersion model based on a look-up table, the look-up table based on the forward modeling;
    determining an approximate mathematical relation for the slowness-travel time dispersion model; and
    building the simplified slowness-travel time dispersion model based at least in part on the approximate mathematical relation.

4. The method of claim 1, further comprising:
    generating an initial guess according to a feature measurement, the feature measurement based on a property of the obtained acoustic wave;
    adjusting a first parameter of the slowness-travel time dispersion model based on the initial guess; and
    determining one of the first parameter or a second parameter for minimizing the misfit.

5. The method of claim 1, further comprising:
    determining a formation body wave slowness at a specific arrival time based on one of the slowness-travel time dispersion model or observed slowness-time curves; and
    performing a correction of the determined formation body wave slowness, the correction based on a look-up table.

6. The method of claim 1, further comprising:
    generating a number of model datasets;
    determining, for each of the model datasets, a fastest modal slowness;
    producing, through a machine learning analysis, a relationship between a true input body wave slowness and the determined fastest modal slowness; and
    performing a final correction to get a final body slowness estimate.

7. The method of claim 1, further comprising:
    classifying a target mode using machine learning analysis of the acoustic wave; and
    processing the semblance based at least in part on the classified target mode.

8. The method of claim 7, wherein the machine learning analysis includes one of a sequential logistic regression or a neural network.

9. The method of claim 1, wherein the obtained acoustic wave comprises one of monopole waves, dipole waves, quadrupole waves, or any combination thereof.

10. The method of claim 1, further comprising adjusting a downhole operational parameter based at least in part on the formation body wave slowness, the operational parameter one of a drilling parameter, a logging parameter, a completion parameter, or a production parameter.

11. The method of claim 1, wherein processing the semblance further comprises determining signal properties of the obtained acoustic wave, the signal properties in one of a time domain, a frequency domain, a coherence value, an amplitude, an instantaneous frequency, a signal-to-noise ratio, or any combination thereof.

12. A non-transitory computer readable medium storing instructions that, when executed by one or more processors, cause the one or more processors to:
    obtain, by an acoustic logging tool within a borehole passing through a formation, an acoustic wave;
    process a semblance from the obtained acoustic wave;
    extract a slowness-travel time measurement from the semblance;
    optimize a slowness-travel time dispersion model by decreasing a misfit between the slowness-travel time dispersion model and the slowness-travel time measurement; and
    determine a formation body wave slowness from a curve of the optimized model.

13. The non-transitory computer readable medium of claim 12, further storing instructions that, when executed by one or more processors, cause the one or more processors to:
    determine a formation body wave slowness at a specific arrival time based on one of the slowness-travel time dispersion model or observed slowness-time curves; and
    perform a correction of the formation body wave slowness, the correction based on a look-up table.

14. The non-transitory computer readable medium of claim 12, further storing instructions that, when executed by one or more processors, cause the one or more processors to:
    generate a number of model datasets;
    determine, for each of the model datasets, a fastest modal slowness;
    produce, through a machine learning analysis, a relationship between a true input body wave slowness and the determined fastest modal slowness; and
    perform a final correction to get a final body slowness estimate.

15. The non-transitory computer readable medium of claim 12, further storing instructions that, when executed by one or more processors, cause the one or more processors to classify a target mode for extracting slowness-time measurements using machine learning analysis, the machine learning analysis including one of a sequential logistic regression or a neural network.

16. The non-transitory computer readable medium of claim 12, further storing instructions that, when executed by one or more processors, cause the one or more processors to adjust a downhole operational parameter based at least in part on the formation body wave slowness, the operational parameter one of a drilling parameter, a logging parameter, a completion parameter, or a production parameter.

17. The non-transitory computer readable medium of claim 12, wherein the obtained acoustic wave comprises one of monopole waves, dipole waves, quadrupole waves, or any combination thereof.

18. The non-transitory computer readable medium of claim 12, wherein processing the semblance further comprises determining signal properties of the obtained acoustic wave, the signal properties in one of a time domain, a frequency domain, a coherence value, an amplitude, an instantaneous frequency, a signal-to-noise ratio, or any combination thereof.

19. The non-transitory computer readable medium of claim 12, further storing instructions that, when executed by one or more processors, cause the one or more processors to:

build a simplified slowness-travel time dispersion model by processing formation characteristics of a borehole environment and limiting which features are received by the slowness-travel time dispersion model to generate the simplified slowness-travel time dispersion model.

20. The non-transitory computer readable medium of claim 19, further storing instructions that, when executed by one or more processors, cause the one or more processors to:

forward model slowness-travel time based on the processed formation characteristics;

generate the slowness-travel time dispersion model based on a look-up table, the look-up table based on the forward modeling;

determine an approximate mathematical relation for the slowness-travel time dispersion model; and build a simplified slowness-travel time dispersion model by processing formation characteristics of a borehole environment and limiting which features are received by the slowness-travel time dispersion model to generate the simplified slowness-travel time dispersion model, the slowness-travel time dispersion model based at least in part on the approximate mathematical relation.

* * * * *